US012634381B2

(12) United States Patent
Luft

(10) Patent No.: US 12,634,381 B2
(45) Date of Patent: May 19, 2026

(54) SYSTEM AND APPARATUS FOR IMPLEMENTING A HIGH SPEED LINK BETWEEN A MOBILE CACHE AND AN EDGE CACHE

(71) Applicant: Netskrt Systems, Inc., Vancouver (CA)

(72) Inventor: Siegfried Luft, Vancouver (CA)

(73) Assignee: Netskrt Systems, Inc., Vancouver (CA)

( * ) Notice: Subject to any disclaimer, the term of this patent is extended or adjusted under 35 U.S.C. 154(b) by 0 days.

(21) Appl. No.: 18/816,183

(22) Filed: Aug. 27, 2024

(65) Prior Publication Data

US 2025/0063104 A1    Feb. 20, 2025

Related U.S. Application Data

(63) Continuation of application No. 17/863,089, filed on Jul. 12, 2022, now Pat. No. 12,081,635, which is a
(Continued)

(51) Int. Cl.
*H04L 67/568* (2022.01)
*H04L 67/5683* (2022.01)
(Continued)

(52) U.S. Cl.
CPC ........ *H04L 67/568* (2022.05); *H04L 67/5683* (2022.05); *H04W 4/40* (2018.02);
(Continued)

(58) Field of Classification Search
None
See application file for complete search history.

(56) References Cited

U.S. PATENT DOCUMENTS 6,785,704 B1    8/2004    McCanne
7,430,614 B2    9/2008    Shen et al.
(Continued)

FOREIGN PATENT DOCUMENTS

EP    3763139 A1    1/2021
FR    3050349 A1    10/2017
(Continued)

OTHER PUBLICATIONS

Decision to Grant, JP App. No. 2020-546923, Aug. 28, 2023, 4 pages (2 pages of English Translation and 2 pages of Original Document).
(Continued)

*Primary Examiner* — Jeffrey R Swearingen
(74) *Attorney, Agent, or Firm* — NICHOLSON DE VOS WEBSTER & ELLIOTT LLP

(57) ABSTRACT

A system and method for implementing a high speed link between a mobile cache and an edge cache. For example, one embodiment of a system comprises: a mobile cache deployed on a vessel/vehicle, the mobile cache to store multimedia content to be provided to passengers on the vessel/vehicle; a first network device including a first plurality of wireless network antennas communicatively coupled to the mobile cache; an edge cache deployed at a designated location at which the vessel/vehicle is expected; a second network device including a second plurality of wireless network antennas communicatively coupled to the edge cache; wherein upon arrival at the designated location, each of the first plurality of wireless network antennas is paired with at least one of the second plurality of wireless network antennas to establish a plurality of simultaneous wireless links to exchange multimedia content between the edge cache and the mobile cache.

20 Claims, 13 Drawing Sheets

Related U.S. Application Data continuation of application No. 17/164,404, filed on Feb. 1, 2021, now Pat. No. 11,394,795, which is a continuation of application No. 15/933,338, filed on Mar. 22, 2018, now Pat. No. 10,911,559.

(60) Provisional application No. 62/638,249, filed on Mar. 4, 2018.

(51) Int. Cl.

| | |
|---|---|
| *H04W 4/40* | (2018.01) |
| *H04W 76/10* | (2018.01) |
| H04L 67/5681 | (2022.01) |
| H04L 67/5682 | (2022.01) |
| H04W 84/12 | (2009.01) |

(52) U.S. Cl.
CPC ......... *H04W 76/10* (2018.02); *H04L 67/5681* (2022.05); *H04L 67/5682* (2022.05); *H04W 84/12* (2013.01)

(56) References Cited

U.S. PATENT DOCUMENTS

| | | | |
|---|---|---|---|
| 7,454,457 | B1 | 11/2008 | Lowery et al. |
| 8,756,341 | B1 | 6/2014 | Richardson et al. |
| 9,161,080 | B2 * | 10/2015 | Crowe ............... H04N 21/2181 |
| 9,654,937 | B2 * | 5/2017 | Addepalli ............. B60R 16/023 |
| 10,182,269 | B1 | 1/2019 | Samant et al. |
| 10,235,503 | B2 * | 3/2019 | Bangole ........... H04W 12/0431 |
| 10,356,201 | B2 * | 7/2019 | Crowe ................ H04L 67/2885 |
| 10,484,308 | B2 | 11/2019 | Liu et al. |
| 10,516,429 | B2 | 12/2019 | Baek et al. |
| 10,785,293 | B2 * | 9/2020 | Law .................... H04L 12/2838 |
| 11,102,260 | B1 | 8/2021 | Wu et al. |
| 2002/0073240 | A1 | 6/2002 | Kokkinen et al. |
| 2003/0005152 | A1 | 1/2003 | Diwan et al. |
| 2004/0057443 | A1 | 3/2004 | Kim et al. |
| 2005/0034158 | A1 | 2/2005 | DeLaVega |
| 2007/0220573 | A1 | 9/2007 | Chiussi et al. |
| 2008/0101405 | A1 | 5/2008 | Wirick et al. |
| 2009/0006724 | A1 | 1/2009 | Chang et al. |
| 2009/0132640 | A1 | 5/2009 | Verma et al. |
| 2009/0219900 | A1 | 9/2009 | Kokkinen et al. |
| 2009/0265743 | A1 | 10/2009 | Gao |
| 2010/0088505 | A1 | 4/2010 | Coppola et al. |
| 2011/0012798 | A1 | 1/2011 | Triolo |
| 2011/0082946 | A1 | 4/2011 | Gopalakrishnan |
| 2011/0116373 | A1 | 5/2011 | Lauer |
| 2011/0164562 | A1 | 7/2011 | Qiu et al. |
| 2011/0179185 | A1 | 7/2011 | Wang et al. |
| 2011/0257834 | A1 | 10/2011 | Hebb |
| 2011/0302320 | A1 | 12/2011 | Dunstan et al. |
| 2011/0320554 | A1 | 12/2011 | Melander et al. |
| 2012/0232791 | A1 | 9/2012 | Sterkel et al. |
| 2012/0265856 | A1 | 10/2012 | Major et al. |
| 2012/0320624 | A1 | 12/2012 | Yamane et al. |
| 2012/0320824 | A1 | 12/2012 | Bari et al. |
| 2013/0007263 | A1 | 1/2013 | Soroushian et al. |
| 2013/0054728 | A1 | 2/2013 | Amir et al. |
| 2013/0097309 | A1 | 4/2013 | Ma et al. |
| 2013/0104251 | A1 | 4/2013 | Moore et al. |
| 2013/0132544 | A1 | 5/2013 | Krishnan et al. |
| 2014/0219230 | A1 | 8/2014 | Schierl et al. |
| 2014/0223502 | A1 | 8/2014 | Doblmaier et al. |
| 2014/0280679 | A1 | 9/2014 | Dey et al. |
| 2014/0280746 | A1 | 9/2014 | Johns |
| 2014/0297881 | A1 | 10/2014 | Shivadas et al. |
| 2014/0365557 | A1 | 12/2014 | Maehara et al. |
| 2014/0379871 | A1 | 12/2014 | Van et al. |
| 2015/0120768 | A1 | 4/2015 | Wellen et al. |
| 2015/0134754 | A1 | 5/2015 | Lauer et al. |
| 2015/0150061 | A1 | 5/2015 | Bleacher et al. |
| 2015/0188923 | A1 | 7/2015 | Snyder |
| 2015/0215738 | A1 | 7/2015 | Frusina et al. |
| 2015/0288732 | A1 | 10/2015 | Phillips et al. |
| 2015/0326636 | A1 | 11/2015 | Surmay |
| 2016/0020946 | A1 | 1/2016 | Morper |
| 2016/0044125 | A1 | 2/2016 | Hardin et al. |
| 2016/0044129 | A1 | 2/2016 | Bergmann et al. |
| 2016/0080279 | A1 | 3/2016 | Tan et al. |
| 2016/0080445 | A1 | 3/2016 | Kazerani et al. |
| 2016/0127334 | A1 | 5/2016 | Bangole et al. |
| 2016/0142510 | A1 | 5/2016 | Westphal et al. |
| 2016/0182966 | A1 | 6/2016 | Hao et al. |
| 2016/0191651 | A1 | 6/2016 | Balakrishnan et al. |
| 2016/0191664 | A1 | 6/2016 | Balakrishnan et al. |
| 2016/0234126 | A1 | 8/2016 | Phillips et al. |
| 2016/0234346 | A1 | 8/2016 | Degani |
| 2016/0249182 | A1 | 8/2016 | Bourlas et al. |
| 2016/0262190 | A1 | 9/2016 | Bitar et al. |
| 2016/0269459 | A1 | 9/2016 | Harden et al. |
| 2016/0269801 | A1 | 9/2016 | Harden et al. |
| 2016/0286457 | A1 | 9/2016 | O'Hare et al. |
| 2016/0295297 | A1 | 10/2016 | Yamagishi |
| 2016/0308958 | A1 | 10/2016 | Navali et al. |
| 2016/0316234 | A1 | 10/2016 | Casey et al. |
| 2016/0337426 | A1 | 11/2016 | Shribman et al. |
| 2016/0350815 | A1 | 12/2016 | Qiu et al. |
| 2016/0366202 | A1 | 12/2016 | Phillips et al. |
| 2017/0013545 | A1 | 1/2017 | Ma |
| 2017/0024201 | A1 | 1/2017 | Diedrich et al. |
| 2017/0078729 | A1 | 3/2017 | Karlsson et al. |
| 2017/0124296 | A1 | 5/2017 | Baldwin et al. |
| 2017/0126256 | A1 | 5/2017 | Salomons et al. |
| 2017/0177898 | A1 | 6/2017 | Dillenberger |
| 2017/0195451 | A1 * | 7/2017 | Backholm ........... H04L 67/5681 |
| 2017/0257446 | A1 | 9/2017 | Bevilacqua et al. |
| 2017/0339224 | A1 | 11/2017 | Condeixa et al. |
| 2017/0347236 | A1 | 11/2017 | Frusina et al. |
| 2017/0353506 | A1 | 12/2017 | Warrick et al. |
| 2017/0353574 | A1 | 12/2017 | Lavi et al. |
| 2018/0020042 | A1 | 1/2018 | Couleaud et al. |
| 2018/0053215 | A1 | 2/2018 | E Costa |
| 2018/0160159 | A1 | 6/2018 | Asarikuniyil |
| 2018/0167789 | A1 | 6/2018 | Tsuchida et al. |
| 2018/0227350 | A1 | 8/2018 | Padmanabhan et al. |
| 2018/0242230 | A1 | 8/2018 | Grinshpun et al. |
| 2018/0367613 | A1 | 12/2018 | Regmi et al. |
| 2019/0020701 | A1 | 1/2019 | Barritt et al. |
| 2019/0109896 | A1 | 4/2019 | Crowder et al. |
| 2019/0191355 | A1 | 6/2019 | Apostolopoulos et al. |
| 2019/0207671 | A1 | 7/2019 | Awad |
| 2019/0230401 | A1 | 7/2019 | Chamberlain et al. |
| 2019/0306265 | A1 | 10/2019 | Hakansson et al. |
| 2020/0205022 | A1 | 6/2020 | Tumuluru |
| 2020/0218658 | A1 | 7/2020 | Pack |
| 2022/0345545 | A1 | 10/2022 | Luft |

FOREIGN PATENT DOCUMENTS

| | | |
|---|---|---|
| JP | 2003-208371 A | 7/2003 |
| JP | 2010-013072 A | 1/2010 |
| JP | 2012-521129 A | 9/2012 |
| JP | 2014-239405 A | 12/2014 |
| JP | 2015-153360 A | 8/2015 |
| JP | 2017-034678 A | 2/2017 |
| WO | 2018/126076 A1 | 7/2018 |
| WO | 2019/120537 A1 | 6/2019 |

OTHER PUBLICATIONS

Decision to Grant, JP App. No. 2021-564831, Nov. 7, 2024, 4 pages (2 pages of English Translation and 2 pages of Original Document).

Dilley et al., "Globally Distributed Content Delivery," IEEE Internet Computing, Sep.-Oct. 2002, pp. 50-58.

European Communication pursuant to Rules 70(2) and 70a(2) EPC, EP App. No. 19765006.2, Oct. 26, 2021, 1 page.

Final Office Action, U.S. Appl. No. 15/933,327, Feb. 18, 2020, 30 pages.

Final Office Action, U.S. Appl. No. 15/933,330, Jan. 15, 2020, 16 pages.

(56)         References Cited

OTHER PUBLICATIONS

Final Office Action, U.S. Appl. No. 15/933,332, Mar. 5, 2020, 25 pages.
Final Office Action, U.S. Appl. No. 15/933,336, Mar. 30, 2020, 38 pages.
Final Office Action, U.S. Appl. No. 15/933,338, May 14, 2020, 36 pages.
Final Office Action, U.S. Appl. No. 16/863,431, Jun. 3, 2021, 15 pages.
Final Office Action, U.S. Appl. No. 17/164,404, Dec. 13, 2021, 20 pages.
Final Office Action, U.S. Appl. No. 17/831,174, Jul. 25, 2023, 10 pages.
Final Office Action, U.S. Appl. No. 17/831,174, May 14, 2024, 11 pages.
Final Office Action, U.S. Appl. No. 17/863,089, Oct. 5, 2023, 24 pages.
Final Office Action, U.S. Appl. No. 17/868,642, Jan. 26, 2023, 16 pages.
Hare et al., "Beyond Deployments and Testbeds: Experiences with Public Usage on Vehicular WiFi Hotspots," MobiSys'12, Jun. 25-29, 2012, pp. 393-406.
Intention to Grant, EP App. No. 19765006.2, Jun. 24, 2024, 6 pages.
International Preliminary Report on Patentability, PCT App. No. PCT/US2019/020487, Sep. 17, 2020, 11 pages.
International Preliminary Report on Patentability, PCT App. No. PCT/US2020/030973, Nov. 11, 2021, 10 pages.
International Search Report and Written Opinion for Application No. PCT/US2019/020487, Jul. 5, 2019, 14 pages.
International Search Report and Written Opinion, PCT App. No. PCT/US2020/30973, Jul. 21, 2020, 11 pages.
International Search Report and Written Opinion, PCT App. No. PCT/US2022/032260, Oct. 11, 2022, 9 pages.
Jiang et al., "TransFetch: A Viewing Behavior Driven Video Distribution Framework in Public Transport", 2016 IEEE 41st Conference on Local Computer Networks (LCN), IEEE, Nov. 7, 2016, pp. 147-155.
Non-Final Office Action, U.S. Appl. No. 15/933,327, Aug. 27, 2019, 28 pages.
Non-Final Office Action, U.S. Appl. No. 15/933,330, Aug. 26, 2019, 14 pages.
Non-Final Office Action, U.S. Appl. No. 15/933,332, Aug. 22, 2019, 23 pages.
Non-Final Office Action, U.S. Appl. No. 15/933,336, Sep. 19, 2019, 34 pages.
Non-Final Office Action, U.S. Appl. No. 15/933,338, Nov. 18, 2019, 34 pages.
Non-Final Office Action, U.S. Appl. No. 16/863,342, Aug. 3, 2021, 21 pages.
Non-Final Office Action, U.S. Appl. No. 16/863,373, Sep. 3, 2021, 26 pages.
Non-Final Office Action, U.S. Appl. No. 16/863,390, Aug. 18, 2021, 19 pages.
Non-Final Office Action, U.S. Appl. No. 16/863,411, Sep. 24, 2021, 21 pages.
Non-Final Office Action, U.S. Appl. No. 16/863,431, Dec. 9, 2020, 12 pages.
Non-Final Office Action, U.S. Appl. No. 16/863,516, Sep. 30, 2021, 32 pages.
Non-Final Office Action, U.S. Appl. No. 16/863,542, Dec. 4, 2020, 10 pages.
Non-Final Office Action, U.S. Appl. No. 17/164,404, Aug. 19, 2021, 20 pages.
Non-Final Office Action, U.S. Appl. No. 17/831,174, Feb. 16, 2024, 10 pages.
Non-Final Office Action, U.S. Appl. No. 17/831,174, Mar. 22, 2023, 11 pages.

Non-Final Office Action, U.S. Appl. No. 17/863,089, Mar. 24, 2023, 26 pages.
Non-Final Office Action, U.S. Appl. No. 17/868,642, Oct. 6, 2022, 25 pages.
Notice of Allowance, KR App. No. 10-2020-7025624, Jul. 31, 2024, 3 pages (1 page of English Translation and 2 pages of Original Document).
Notice of Allowance, U.S. Appl. No. 15/933,327, Jun. 15, 2020, 11 pages.
Notice of Allowance, U.S. Appl. No. 15/933,330, May 4, 2020, 10 pages.
Notice of Allowance, U.S. Appl. No. 15/933,330, Sep. 11, 2020, 9 pages.
Notice of Allowance, U.S. Appl. No. 15/933,332, Aug. 26, 2020, 9 pages.
Notice of Allowance, U.S. Appl. No. 15/933,336, Jul. 9, 2020, 12 pages.
Notice of Allowance, U.S. Appl. No. 15/933,338, Sep. 30, 2020, 8 pages.
Notice of Allowance, U.S. Appl. No. 16/863,342, Mar. 7, 2022, 11 pages.
Notice of Allowance, U.S. Appl. No. 16/863,373, Feb. 24, 2022, 10 pages.
Notice of Allowance, U.S. Appl. No. 16/863,390, Dec. 23, 2021, 10 pages.
Notice of Allowance, U.S. Appl. No. 16/863,411, Mar. 21, 2022, 13 pages.
Notice of Allowance, U.S. Appl. No. 16/863,431, Oct. 7, 2021, 8 pages.
Notice of Allowance, U.S. Appl. No. 16/863,467, Jun. 16, 2021, 18 pages.
Notice of Allowance, U.S. Appl. No. 16/863,516, Feb. 9, 2022, 10 pages.
Notice of Allowance, U.S. Appl. No. 16/863,516, Mar. 23, 2022, 6 pages.
Notice of Allowance, U.S. Appl. No. 16/863,542, May 12, 2021, 9 pages.
Notice of Allowance, U.S. Appl. No. 17/164,404, Mar. 18, 2022, 19 pages.
Notice of Allowance, U.S. Appl. No. 17/831,174, Aug. 14, 2024, 14 pages.
Notice of Allowance, U.S. Appl. No. 17/863,089, Apr. 17, 2024, 7 pages.
Notice of Allowance, U.S. Appl. No. 17/863,089, Jul. 25, 2024, 5 pages.
Notice of Allowance, U.S. Appl. No. 17/868,642, Apr. 5, 2023, 11 pages.
Notice of Reasons for Refusal, JP App. No. 2020-546923, Mar. 6, 2023, 4 pages (2 pages of English Translation and 2 pages of Original Document).
Office Action, EP App. No. 19765006.2, Jul. 25, 2022, 8 pages.
Office Action, EP App. No. 20799471.6, Mar. 5, 2024, 6 pages.
Office Action, JP App. No. 2021-564831, Mar. 18, 2024, 6 pages (3 pages of English Translation and 3 pages of Original Document).
Office Action, KR App. No. 10-2020-7025624, Mar. 4, 2024, 14 pages (7 pages of English Translation and 7 pages of Original Document).
Supplementary European Search Report and Search Opinion, EP App. No. 19765006.2, Oct. 8, 2021, 11 pages.
Supplementary European Search Report and Search Opinion, EP App. No. 20799471.6, Nov. 29, 2022, 12 pages.
Webster, Eva, "Definition: MIMO (multiple input, multiple output)", TechTarget.com, Available Online at <https://www.techtarget.com/searchmobilecomputing/definition/MIMO>, Retrieved on Mar. 21, 2023, 5 pages.
European Search Report and Search Opinion, EP App. No. 24189016.9, Nov. 13, 2024, 12 pages.
Non-Final Office Action, U.S. Appl. No. 18/231,407, Dec. 18, 2024, 23 pages.

* cited by examiner

SYSTEM AND APPARATUS FOR IMPLEMENTING A HIGH SPEED LINK BETWEEN A MOBILE CACHE AND AN EDGE CACHE

CROSS-REFERENCE TO RELATED APPLICATIONS

This application is a continuation of application Ser. No. 17/863,089, filed Jul. 12, 2022, which is a continuation of application Ser. No. 17/164,404, filed Feb. 1, 2021 (now U.S. Pat. No. 11,394,795, issued Jul. 19, 2022), which is a continuation of application Ser. No. 15/933,338, filed Mar. 22, 2018 (now U.S. Pat. No. 10,911,559, issued Feb. 2, 2021), which claims priority to the Provisional Application No. 62/638,249, filed Mar. 4, 2018, which are hereby incorporated by reference.

TECHNICAL FIELD

The embodiments of the invention relate generally to the field of data distribution to a mobile environment. More particularly, the embodiments relate to a system and method for implementing a high speed link between a mobile cache and an edge cache.

BACKGROUND ART

Offering WiFi to customers in mobile environments is a necessity for many businesses. For example, many airlines, cruise ships, bus fleets, and train systems offer WiFi to passengers. However, customer expectations are increasingly unattainable given the variable connectivity and minimal bandwidth during transit in these mobile environments.

The average household streams content on multiple devices in the range of 500 GB/month. When travelling, consumers are beginning to expect the same level of network access, which is impractical on current systems given the number of passengers and low bandwidth connectivity in these environments.

BRIEF DESCRIPTION OF THE DRAWINGS

A better understanding of the present invention can be obtained from the following detailed description in conjunction with the following drawings, in which.

DETAILED DESCRIPTION

Figure 1A:
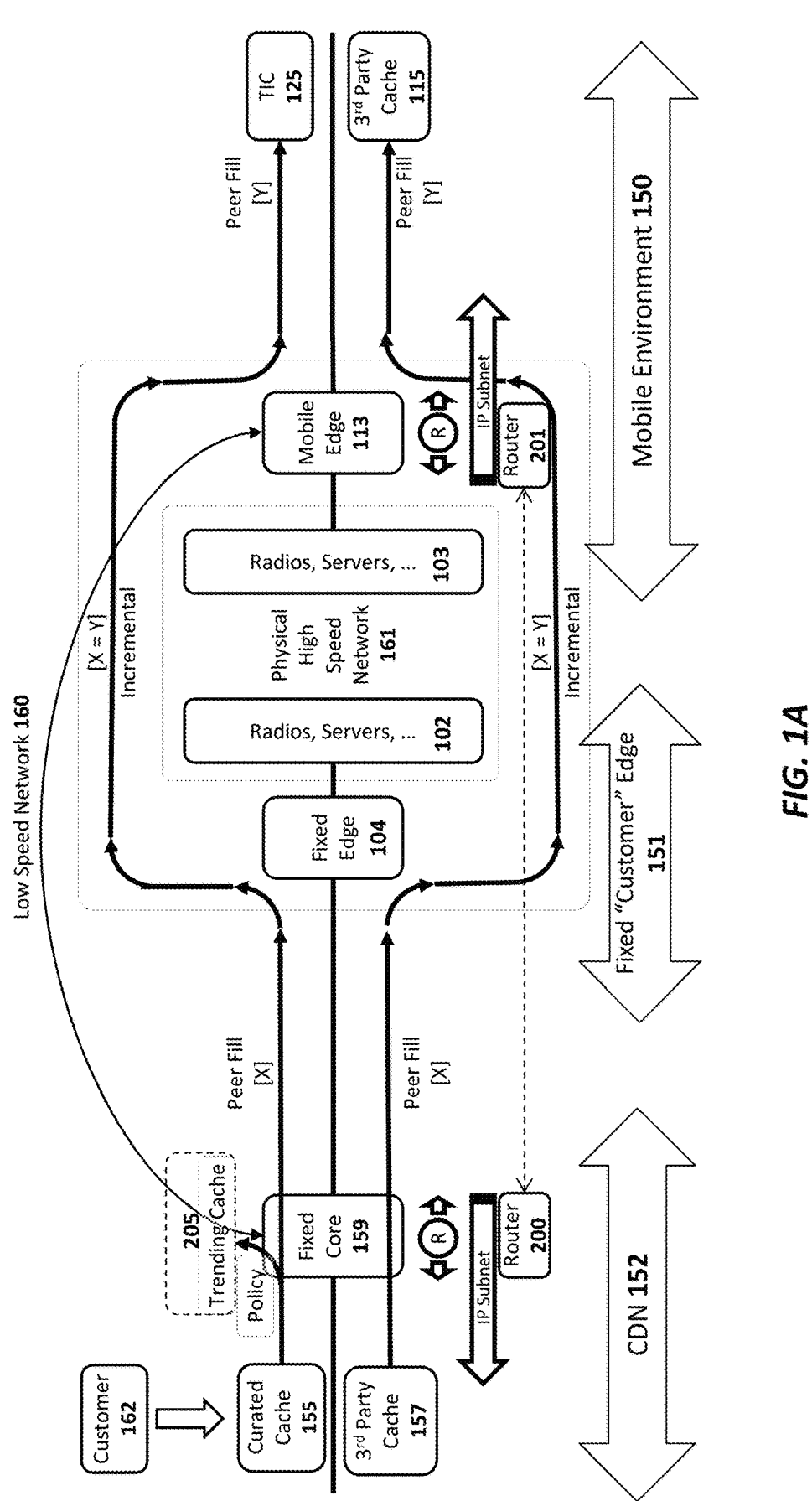
FIG. 1A illustrates one embodiment of the invention for connecting a mobile edge device to one or more cache systems.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention The embodiments of the invention meet the expectation of end users to be connected, anywhere, anytime, even in remote locations and on the go where bandwidth has traditionally been limited. In particular, intelligent caching techniques are described which host content at strategic locations. In one embodiment, caching and associated Content Delivery Networks (CDN) solve networking congestion limitations by pre-loading content behind the point of congestion.

Existing caching and CDN technologies require continuous high-speed connectivity to operate correctly, which is not available in mobile environments such as airplanes, trains, buses, and passenger ships. Consequently, these businesses are increasingly disadvantaged, creating pent up demand for a solution within a very large market.

One embodiment of the invention addresses the lack of connectivity available to the mobile environment by augmenting existing connectivity with additional high speed access points at strategic locations where the mobile environment can be anticipated to pause for either deterministic or non-deterministic periods of time. Management of these dual networks, in one embodiment, is provided by an Internet Service Provider (ISP). However, given the focus on large datasets (e.g. Video) this entity is referred to herein as a Content Service Provider (CSP).

In one embodiment, the CSP manages each mobile environment as a connected subnetwork of the aggregate CSP's network. In one implementation, this is accomplished by defining IP subnetworks. In particular, the mobile environment is configured as a routable IP subnetwork that may be reached either through the low speed communication channels (e.g., a satellite link or cellular network connection which is available when the mobile environment is in transit) or the high speed network (e.g., when the mobile environment reaches a strategically located high speed link).

If the mobile environment passes through several locations with high speed networks, in one implementation, it will utilize a routing protocol such as the Interior Gateway Protocol (IGP), to announce that there is a new route to the subnetwork. At all times, a lower priority route is available through the low speed network.

The CSP is will deploy these high speed networks in strategic locations, where the mobile environment is known to pass. The CSP may also ensure that content can be transmitted to the mobile environment when a high speed connection is established. This can be achieved in a number of ways, relative to various aspects of the invention Sufficient connectivity to the edge location+high speed connection can be engineered to ensure data transfers can be made in a timely manner Data can be transmitted to the edge location, and await further transfer to the mobile environment when the high speed connection is established In one embodiment of the invention, an existing cache such as a Netflix Open Connect Appliance (OCA) can be hosted by the CSP at a central location. If the mobile environment establishes a connection to a high speed connection at one or more edges of the CSP network, another cache (e.g., another Netflix OCA) can initiate a scheduled peer fill from the central cache. The peer fill may be either instantaneously scheduled or predictable.

In another embodiment of the invention, an intermediate storage device, sometimes referred to below as a "capacitor" device, retains the data designated for one or more mobile environments. The locally connected mobile environment includes a Content Distribution Node (CDN) that downloads content from the capacitor when in range of the high speed connection.

As discussed below, in certain situations, the CDN node in the mobile environment uploads content to the capacitor. For example, certain capacitors configured in remote locations may lack a high speed link to the CSP network. In such a case, as mobile environments with large CDN nodes come within range (e.g., cruise ships), the capacitor may retrieve as much data as possible from those CDN nodes and subsequently provide that content to CDN nodes of mobile environments. This facilitates the mobile environment as a mechanism of the CSP to distribute content throughout its network and is particularly beneficial for large datasets that take days or weeks to transmit.

The CDN node, in one implementation, is the intermediary to one or more cache types that may be associated with the mobile environment. For example, a Netflix OCA, Google Global Cache (GGC), a Transparent Cache working with content providers, or a more traditional Transparent Cache that simply replicates traffic known to represent desired content. In all cases, the CDN node can allow local copies to be propagated to the mobile environment in a predicable manner, where connectivity is abstracted from the caches. This permits scheduled cache fills from caches such as Netflix and Google; as well as other more flexible mechanisms.

The capacitors of the CSP network host pooled content at rest. In one implementation of the invention, this content may be owned by other parties (e.g. Netflix) and require visibility to where it has been copied and distributed. For example, certain content providers such as Netflix require knowledge of where all copies of content are stored. Each copy distributed by a capacitor to a CDN node, and a CDN node to a cache, may be recorded, such that all storage locations are known and reported back to the content provider. Furthermore, one embodiment provides techniques to purge content when necessary (e.g. killing the cypher used to decode the content).

FIG. 1A illustrates an exemplary embodiment in which a content distribution network (CDN) 152 operates as an Internet Service Provider for a transportation organization such as a train service, airline, bus service, and/or cruise/ ferry service. In this example the passenger transportation vessel/vehicle 150, which represents any form of transportation vehicle (e.g., a ship, train, bus, airplane), is equipped with a mobile edge 113 which periodically connects to one or more fixed edges 104 via high speed networks 161. Various different types of wireless radios, wired transceivers, protocols, servers, etc, 102, 103, may be used to form the physical high speed connection including 802.11 protocols (WiFi) and Gigabit Ethernet protocols. When the transportation vehicle arrives or passes by a stationary fixed edge 104, connectivity may established using different techniques.

In one instance, a curated cache 155 directly connects to a transparent cache (TIC) 125 in the mobile environment, via a fixed edge 104, high speed network 161, and mobile edge 113. One embodiment relies on scheduled connectivity and sufficient connectivity to complete the cache fill. This is defined by Peer Fill X=Y.

Alternatively, or in addition, a $3^{rd}$ party cache 157 peers with a connected $3^{rd}$ party cache 115, via fixed edge 104, high speed network 161, and mobile edge 113. Once again, one embodiment relies on scheduled connectivity and sufficient connectivity to complete the peered cache fill. This is defined by Peer Fill X=Y.

Figure 1B:
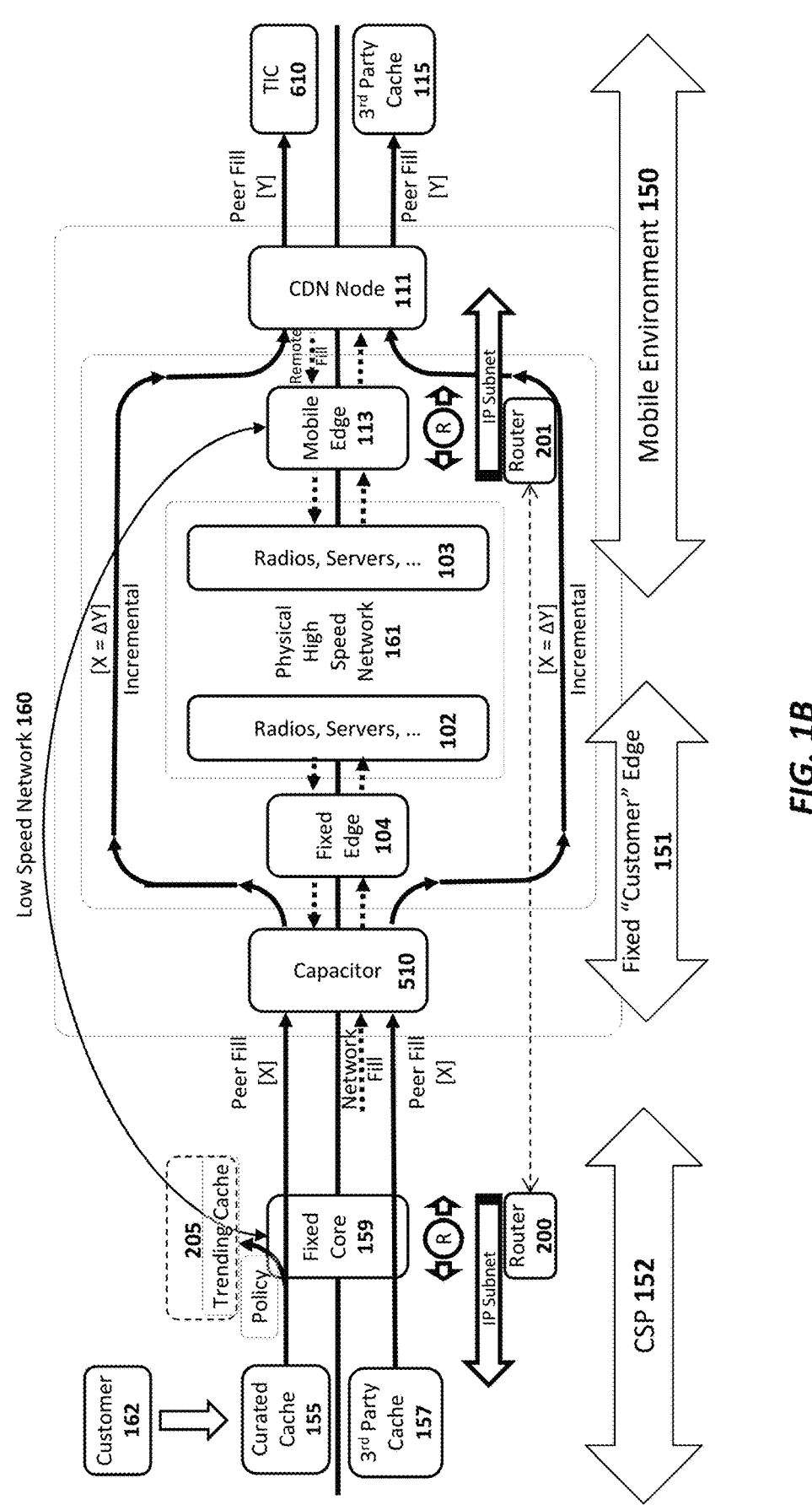
FIG. 1B illustrates one embodiment of the invention which includes a capacitor and a content distribution network (CDN)

FIG. 1B illustrates an exemplary embodiment in which connectivity is augmented with both a capacitor 510 (at the fixed location) and CDN node 111 (in the mobile environment). In the illustrated implementation, these devices manage the transient nature of high speed network 161, by pooling data within each device. In one embodiment, high speed network 161 may be significantly faster than the network connecting the capacitor 510 to the CSP network 152 (e.g., via fixed core 159). By storing cache data at the capacitor, a-priori, the maximum speed available to high speed network 161 can be achieved, and multiple mobile environments 150 can be concurrently and/or consecutively updated from the same capacitor 510.

For example, in one instance, a curated cache 155 transmits its contents to one or more capacitors 510 in multiple locations. Then as a mobile environment 150 approaches a specific fixed edge 151, the physical high speed network 161 is established under the control of fixed edge 104 and mobile edge 113. The CDN node 111 establishes connectivity with the capacitor 510, and proceeds to download content currently stored on the capacitor 510. The CDN node 111 in this embodiment is responsible for managing incremental downloads. For example, the mobile environment 150, may stop at two or more fixed edges 151 over a period of time. Each stop may only facilitate a partial transfer of data. Upon completion of a full transfer to the CDN node 111, the TIC 610 receives a continuous peer fill from the CDN node 111. This may be defined by the equation Peer Fill X=ΔY.

In one instance, a $3^{rd}$ party cache 157 peer fills its contents to one or more capacitors 510 in multiple locations. Then as a mobile environment 150 approaches a specific fixed edge 151, the physical high speed network 161 is established under the control of fixed edge 104 and mobile edge 113. The CDN node 111 establishes connectivity with the capacitor 510, and proceeds to download cached content stored on the capacitor 510. The CDN node 111 is responsible for managing incremental downloads (e.g., identifying content that it does not have and requesting that content from the capacitor 510). For example, the mobile environment 150, may stop at two or more fixed edges 151 over a period of time. Each stop may only facilitate a partial transfer of data. Upon completion of a full transfer to the CDN node 111, the 3rd party cache 115 receives a continuous peer fill from the CDN node 111. Again, this may be defined as Peer Fill X=ΔY.

In one implementation, a curated cache 155 or portions thereof are deemed high priority. This high priority cache or portion of a cache is referred to herein as a trending cache 205. In one embodiment, cache fills from a trending cache 205 occur over the low speed network 160 when the high speed link 161 is unavailable. By way of example, the data within the trending cache 205 may be the most popular/ frequently requested data as determined by the CSP. In this implementation, the fixed core 159 may permit the trending cache 205 to be routed over the low speed network 160 to mobile edge 113, and through to the CDN node 111. As mentioned, the low speed network may include mobile wireless technologies such as satellite, cellular (e.g., LTE), or long range WiFi. From there, a Peer Fill X=Y is completed to TIC 610 and/or $3^{rd}$ party caches.

As previously described, in some instances, a capacitor 510 may not have a high speed connection to the fixed core 159. In this instance, a connected CDN node 111 may be asked to upload specific cache content to the capacitor, via the mobile edge 113, the high speed network 161, and the fixed edge 104. In one embodiment, this is accomplished by the capacitor and CDN node exchanging messages to identify cached content stored on the CDN node 111 but not stored on the capacitor. The capacitor may then request such content from the CDN node 111, potentially in a prioritized order based on popularity or a "most frequently requested" value associated with each item of content. In this implementation, mobile environment 150 becomes a distribution network for the fixed edge 151 and vice versa.

In one embodiment, the mobile environment 150 is an addressable extension of the CSP 152. For every established high speed network 161 encountered by mobile environment 150, reachability must be accomplished by ensuring network connectivity. Fixed core 159 provides policy routing to either the low speed network 160 or through to fixed edge 104 and high speed network 161. In the case where high speed network 161 is established, mobile edge 113 communicates back to the fixed core 159 that it is connected and accessible. In one embodiment, this is accomplished by a network router at 201 which issues an Interior Gateway Protocol (IGP) update to router 200 directly associated with the fixed core 159. For example, the router 201 of the mobile environment may provide router 200 with TCP/IP data (e.g., a new TCP/IP address) that router 200 can use to establish a connection to router 201.

Figure 2:
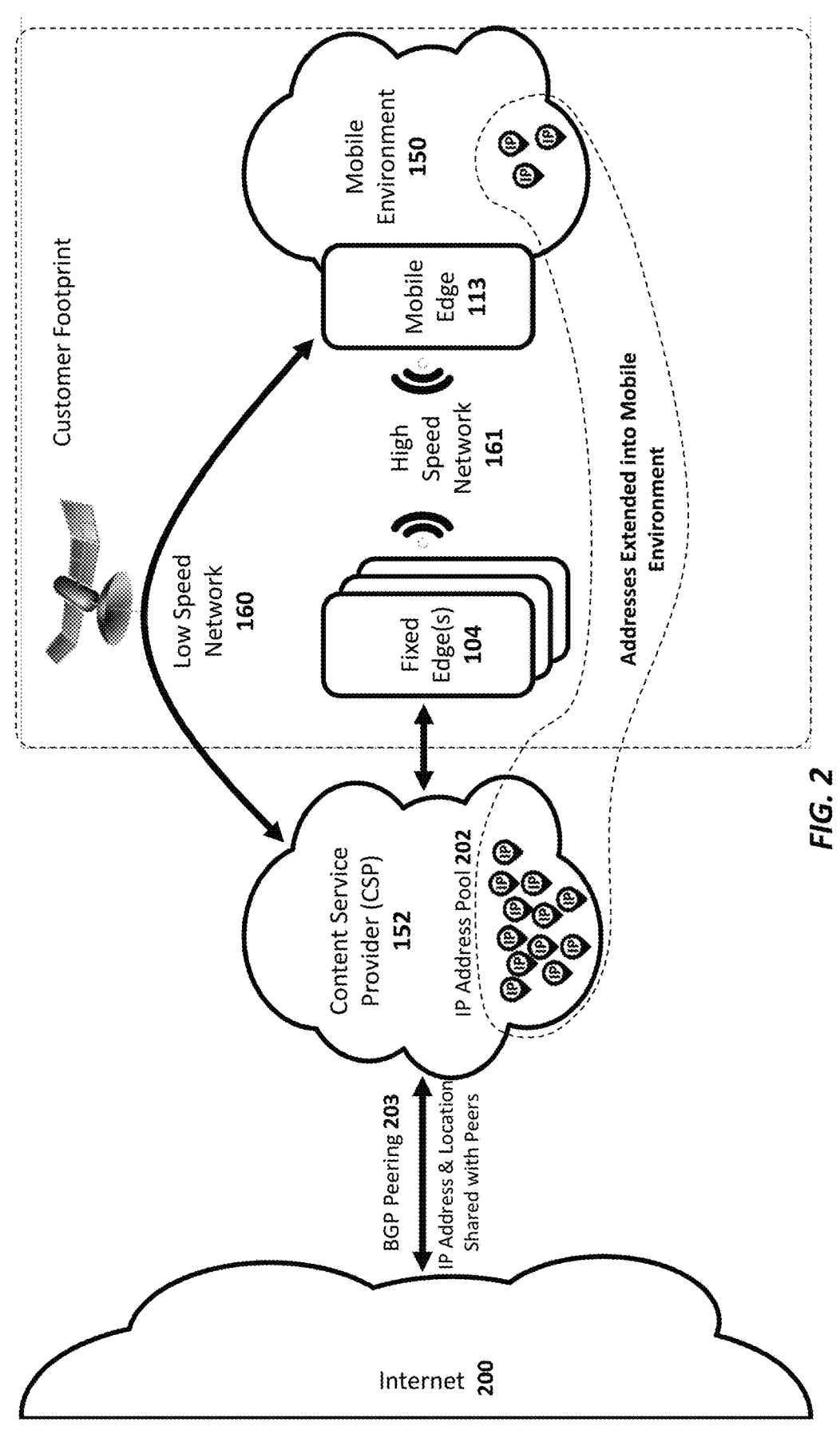
FIG. 2 illustrates additional features including allocating content service provider (CSP) addresses into the mobile environment.

As illustrated in FIG. 2, the content service provider 152 may be allocated a large pool of IP addresses 202, portions of which may be allocated to the various mobile environments 150 (e.g., trains, ships, buses, planes). As mentioned, this may be accomplished by defining a different subnetwork for each mobile environment 150 and allocating the mobile environment all of the IP addresses within that sub-network.

In one embodiment, the Border Gateway Protocol (BGP) may be used to exchange routing and reachability information among different network components. For example, in FIG. 2, a BGP peering connection 203 is used to share IP addresses and locations with content providers (e.g., Netflix, Google, Amazon, etc) who require location information related to IP addresses in the mobile environment 150.

Figure 3:
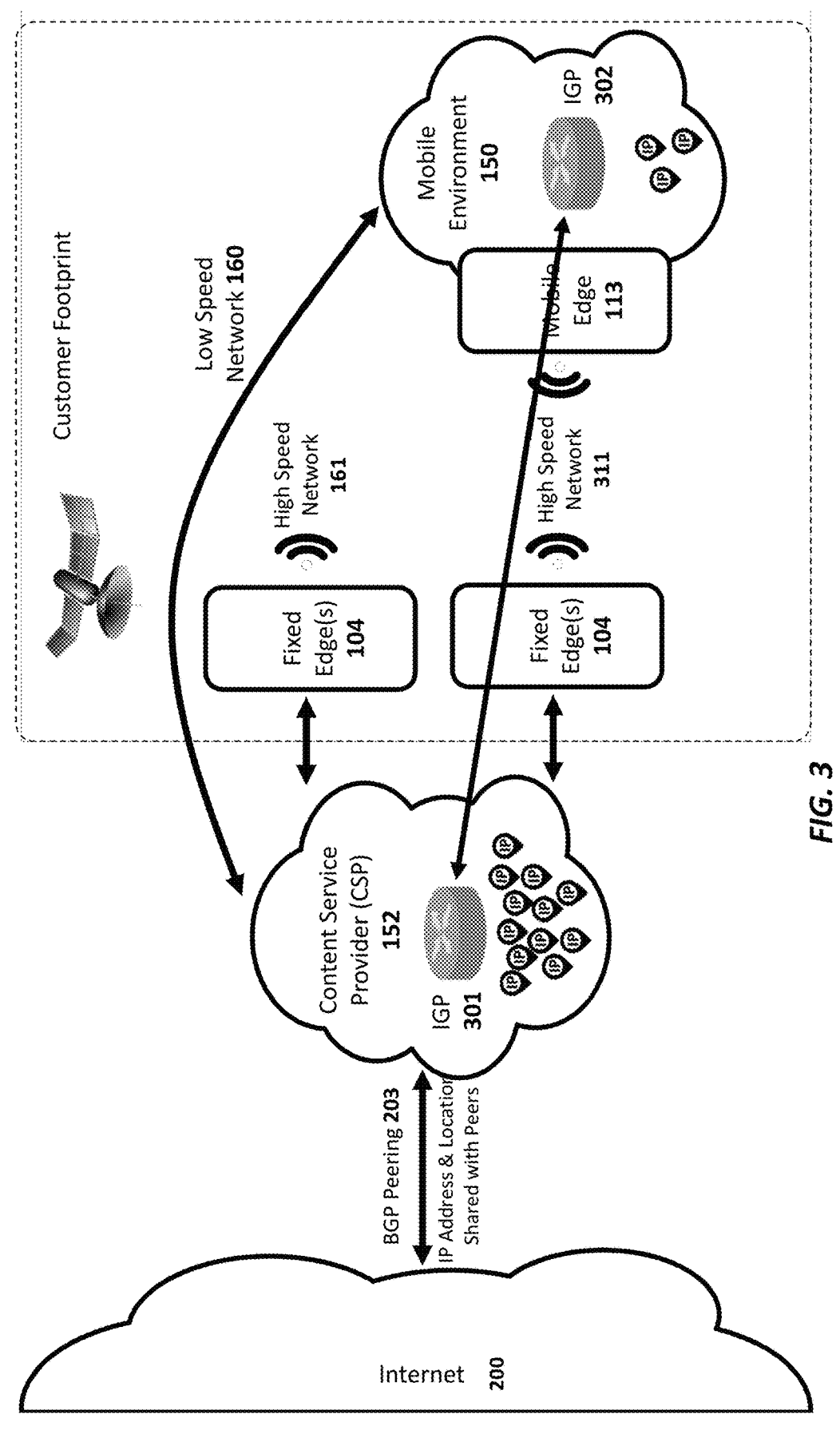
FIG. 3 illustrates additional features including usage of the Interior Gateway Protocol (IGP) and Border Gateway Protocol for managing network connectivity.

FIG. 3 highlights how an IP address in a mobile environment 150 establishes a routable connection back to the CSP 152, even when moving from a first high speed network 161 to a second high speed network 311. In particular an IGP router 302 is aware that high speed network 311 is established, and propagates its local subnetwork information to IGP router 301 within the CSP network 152. Using the updated IGP router 301, the CSP 152 may route packets to the mobile environment 150. Note that prior to the establishment of high speed network 311 (e.g., while the mobile environment 150 is in transit), IP addresses could still be routed through low speed network 160.

Figure 4:
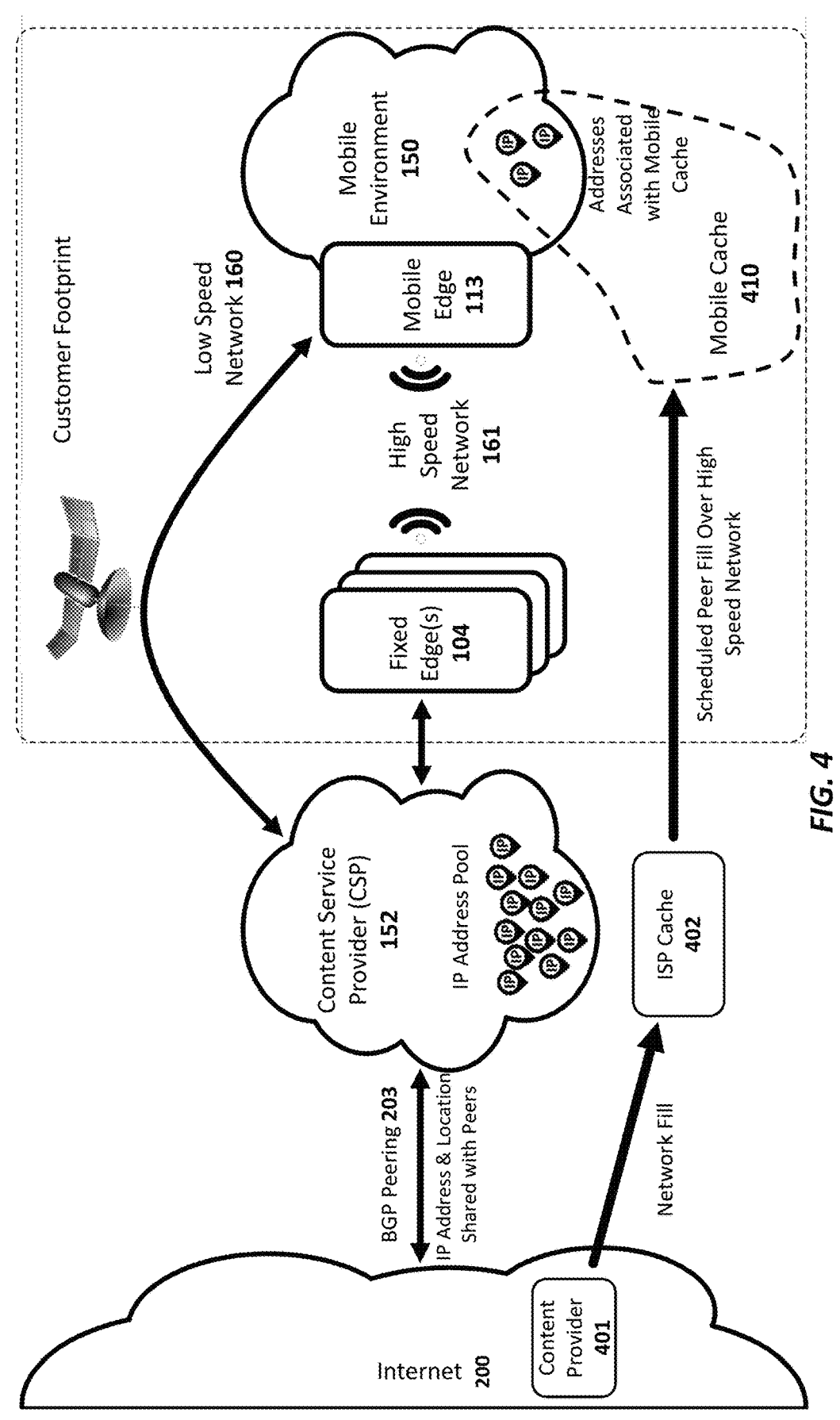
FIG. 4 illustrates one embodiment which includes an Internet Service Provider (ISP) cache to store content service provider content.

FIG. 4 illustrates an example of content cache management in this environment. In this example, a specific $3^{rd}$ party cache 410 is deployed into the mobile environment 150, and is part of the CSP subnetwork (i.e., having an IP address range allocated by the CSP). In one embodiment, the CSP 152 identifies the range of subnetwork addresses within proximity of the $3^{rd}$ party cache back to the $3^{rd}$ party content provider 401 via the BGP Peering link 203. The CSP 152 also deploys a $3^{rd}$ party cache 402 within the CSP 152 to operate as an ISP cache 402. In this embodiment, all updates from the $3^{rd}$ party content provider 401 are made directly to the ISP cache 402 over the CSP network gateway. The third party mobile cache 410 is then updated from the ISP cache 402 upon an event such as a scheduled or unscheduled peer fill over the high speed network 161.

In one embodiment, requests to access content from user devices in the mobile environment 150 may initially be routed to the content provider 401 over the low speed network 160. As a result of the BGP peering connection 203 which provides network connectivity information to the content provider 401 as described above, the content provider 401 redirects the user devices to the mobile cache 410 (assuming it contains a copy of the requested content). Redirection by the content provider also requires that the user authenticates with the content provider 401 to receive authorization to render the requested content. In one embodiment, following authentication, the content provider 401 will perform a lookup of the location of the user (e.g., with the BGP peering data) and see the association between the user's IP address and the mobile cache 410 (which are in the same sub-network). Subsequent communication may then be directed to the mobile cache 410.

Figure 5:
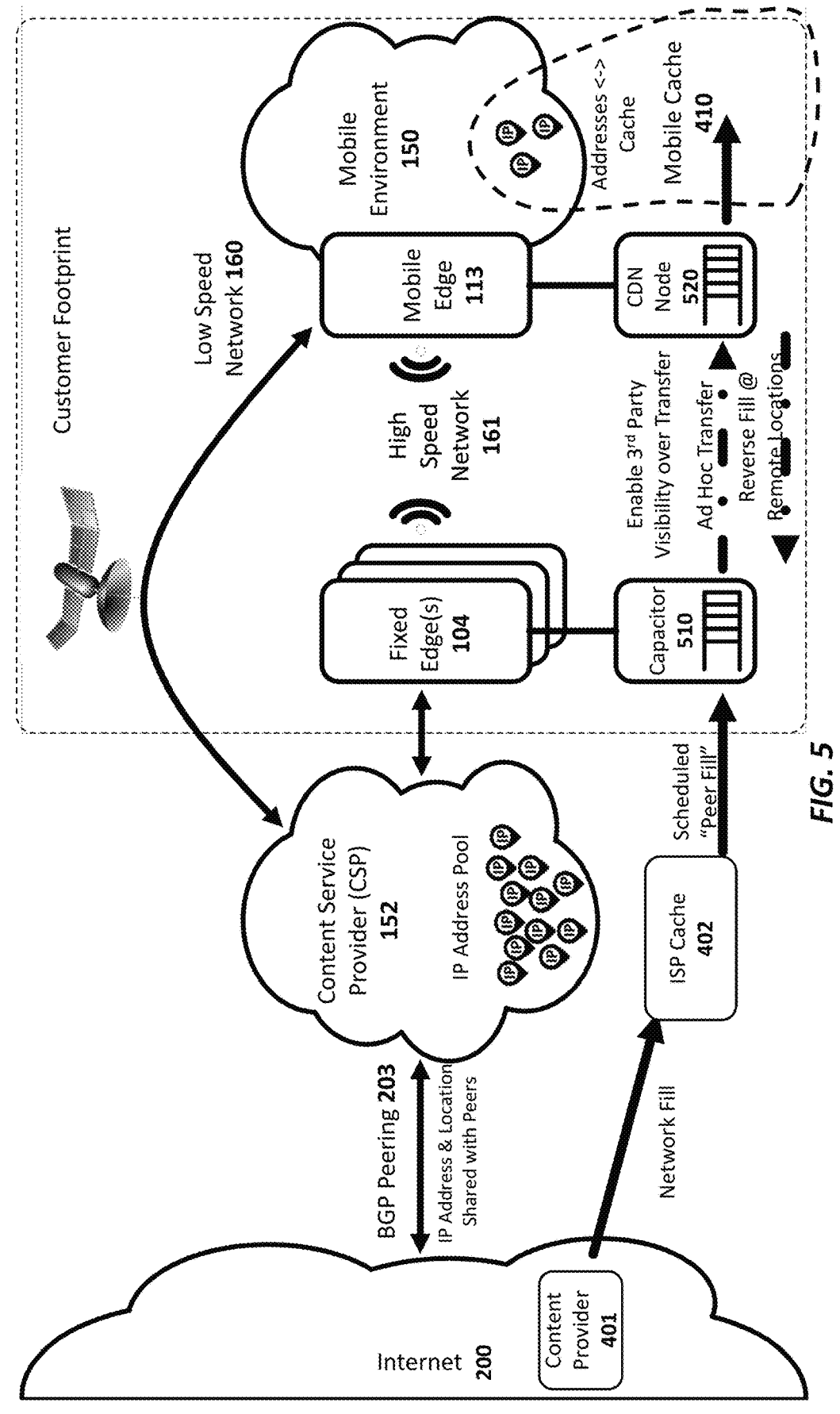
FIG. 5 illustrates additional details for one embodiment including a capacitor and CDN node.

FIG. 5 illustrates additional details of one embodiment which includes a capacitor 510 and CDN node 520 (e.g., which operate generally as described with respect to FIG. 1B). In the illustrated example, content provider 401 network fills are pushed out to one or more ISP caches 402. The ISP cache 402 then performs scheduled peer fills to each capacitor 510 at a fixed edge 104. When the high speed network 161 is established at a particular location (e.g., train/airport/bus/ship terminal), the capacitor 510 forms a connection with the CDN node 520 and provides content to the CDN node 520 over the high speed link 161. As mentioned, the capacitor 510 may send the CDN node 520 a list of the content it has available and the CDN node 520 may compare this list against its existing content. It may then request all (or a subset) of the content that it is not currently caching locally. Alternatively, the CDN node 520 may transmit the capacitor a list of its content and the capacitor may perform the filtering operation to identify content required by the CDN node 520. In either case, the list of content needed by the CDN node 520 may be prioritized based on variables such as popularity, content size, etc. This will ensure that the content most likely to be needed in the mobile environment 150 has been transferred from the capacitor 510 to the CDN node 520 (i.e., in cases where the high speed network 161 is only available for a limited time).

In addition, as mentioned above, a reverse fill operation may be performed in some instances where a capacitor 510 has a relatively low bandwidth link back to the ISP cache 402 and/or content provider 401 (e.g., if the capacitor is in a remote location). In such a case, when a CDN node 520 on a cruise ship, for example, forms a high speed connection with the capacitor 510, it may perform a reverse fill operation to provide the capacitor with content for the duration of the connection. The capacitor 510 may then provide this content to other CDN nodes for other mobile environments 150.

Figure 6:
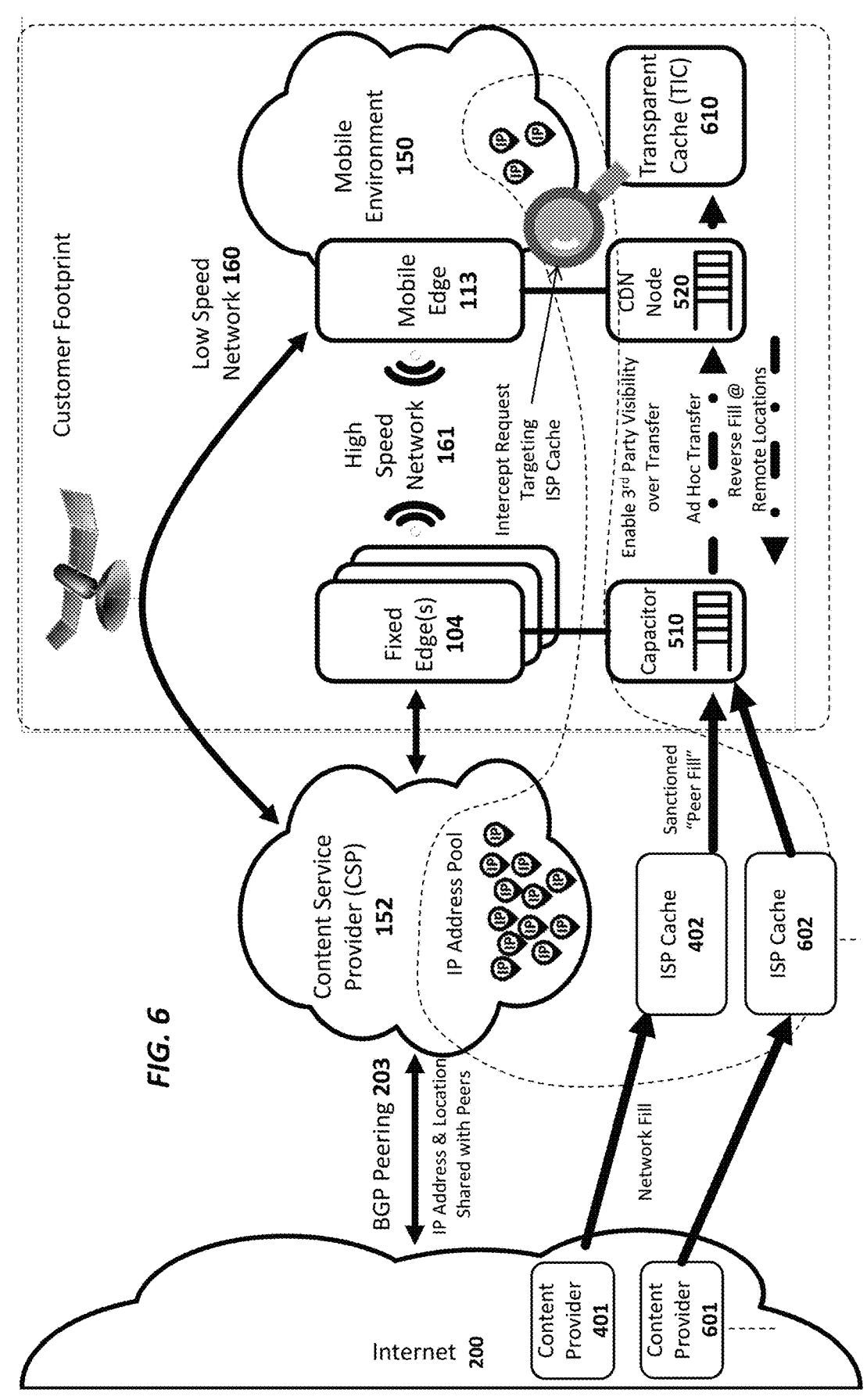
FIG. 6 illustrates one embodiment including a transparent cache (TIC)

FIG. 6 illustrates another embodiment which utilizes a transparent cache 610. One benefit of the transparent cache 610 is that it may be configured as a composite of multiple caches from multiple different content providers 401, 601. The additional content providers 601 may interact with the system in the same manner as described above for content provider 401 (e.g., performing a network fill operation on ISP cache 602). This embodiment addresses a problem for markets where the mobile environment 150 is not of a significant size to warrant full third party/content provider caches. For example, an OCA cache from Netflix will support as much as 80 Gbps of streaming traffic which is excessive for a bus or plane environment. Moreover, a content provider such as Netflix might not deploy such a device in a mobile environment of under 100 or even 500 users.

In an embodiment where the content of the ISP Cache(s) 402, 602 can be trusted to be hosted on the transparent cache (TIC) 610, then the TIC 610 may have a full representation of the ISP cache 402, 602. A "Sanctioned Peer Fill" refers to the ability for an ISP cache 402, 602 to share its contents with a TIC 610. The capacitor 510, high speed network 161, and CDN node 520 operate as described above to distribute the content. The TIC 610 of this embodiment has an easier job identifying which requests are to be intercepted. For example, when a user in the mobile environment 150 requests content from a third party content provider 401, 601 (e.g., Netflix), a request is made to the content provider 401, 601 over the internet 200. The content provider returns a reference to its ISP Cache 402, 602, respectively, rather than one physically located in the mobile environment 150. In this embodiment, the IP addresses within the mobile environment 150 are not distinguished. The BGP peering connection 203 announces ALL addresses of the CSP 152 to the Internet, including the content providers 401, 601. Furthermore, the closest cache will be the ISP caches 402, 602. Thus the user device will attempt to connect to an ISP cache 402, 602 and the transparent cache 610 only needs to see this destination address and it can safely intercept, redirect and service the request from its local copy of the content.

Figure 7:
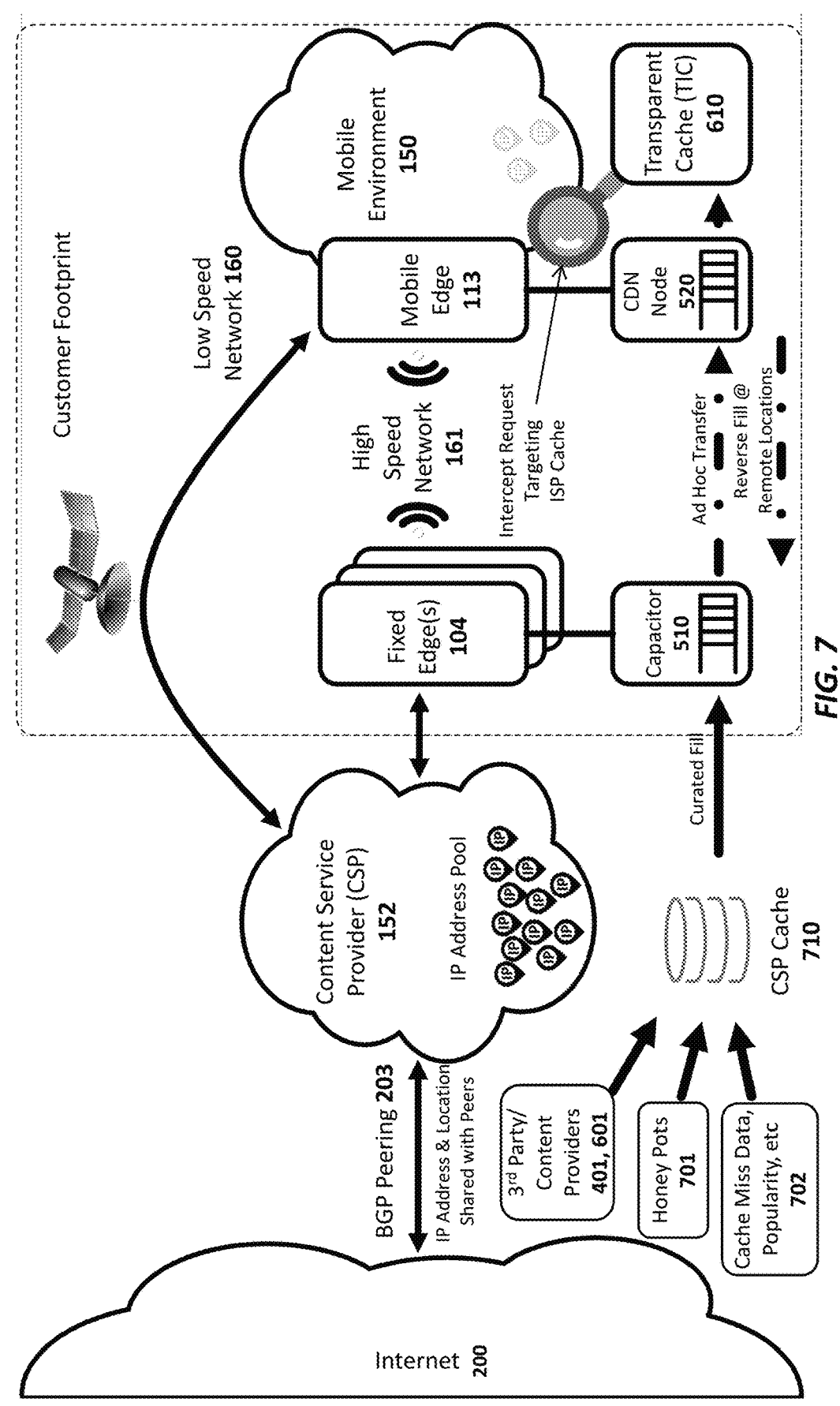
FIG. 7 illustrates one embodiment in which a CSP cache stores content from a variety of sources including content providers.

In the embodiment illustrated in FIG. 7, a curated CSP cache 710 stores data from multiple content providers 401, 601 in accordance with cache fill policies. The cache is curated to the extent that a specific set of rules/policies are used to determine which content to store. For example, to render caching decisions, data 702 such as cache miss data, popularity data, etc, may be gathered from each of the transparent caches 610 deployed in the field. In addition, data 701 may be collected from honey pots configured in strategic network locations on the Internet and designed to observe user trends. Other variables may be factored into the caching policy including, but not limited to customer requests (e.g., requests from a content provider 410, 610 to cache certain items of content).

Figure 8:
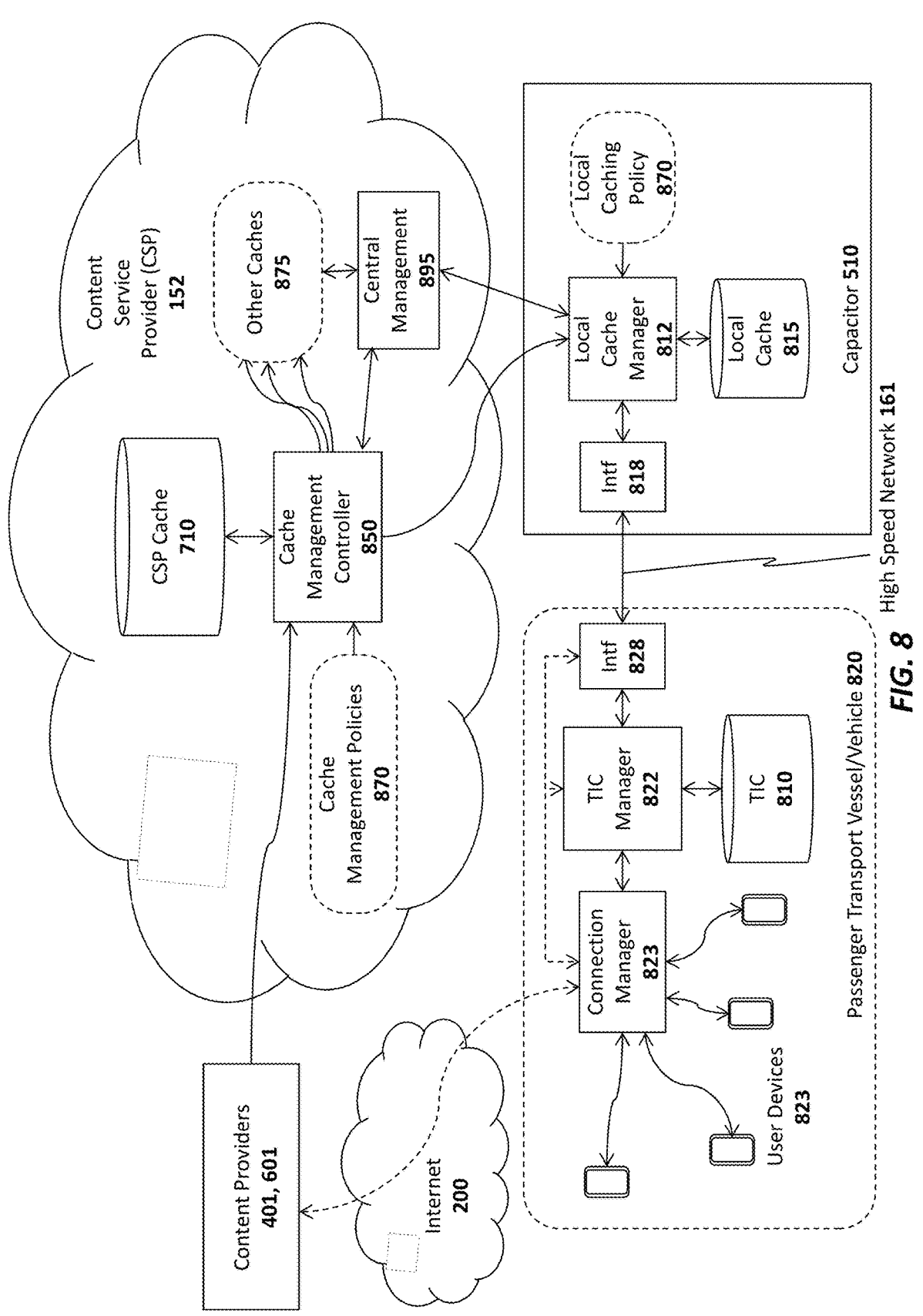
FIG. 8 illustrates additional details of one embodiment of the invention.

FIG. 8 highlights certain aspects of the system. Note that some elements shown in prior figures are dropped to avoid obscuring the highlighted features. In this embodiment, a central cache management controller 850 managed by the CSP 152 renders decisions on which particular content to store from each of the content providers 401, 601 (e.g., based on cache miss variables, content provider preferences, and/or other variables discussed above). In addition, the cache management controller 850 determines when and how to fill content to each of the capacitors 510 based on specified cache management policies 870. For example, cache management policies 870 may indicate a particular speed at which local caches 815 are to be filled and/or a particular time period during which the local cache fills are to occur (e.g., in the middle of the night when bandwidth is available). The cache fill policies 870 may be specified by feedback from user requests and/or the content providers 401, 601 (e.g., Netflix). For example, if a particular video is being viewed frequently by users then the cache fill policy 870 may specify that the cache management controller 850 should fill all local caches 115, 175 with this particular video.

In one embodiment, one or more content provider caches 140, 160 periodically (e.g., nightly) fill one or more CSP caches 710 with specified content. This may be done, for example, with the most popular multimedia content (e.g., the most popular movies and TV shows). The cache management controller 850 then fills the local caches 815 at various capacitors 510 via communication with corresponding local cache managers 812. In one embodiment, each local cache manager 812 may implement its own local caching policy 870 for establishing communication with TIC managers 822 of different transportation vessels/vehicles 820 to fill the respective TICs 825 with content. In one embodiment, the interfaces 828, 818 comprise high speed wired or wireless links (as described above with respect to high speed network 161) which operate at maximum capacity (e.g., 30 GB/s, 100 GB/s, etc) as soon as the transportation vessels/vehicles 820 arrive or pass by the capacitor 510. By way of example, and not limitation, the stationary content distribution location where the capacitor 510 is configured may be a train station, bus terminal, cruise ship port/terminal, or airport terminal/gate. In addition, in certain embodiments described herein, capacitors 510 are strategically positioned at locations along the known path which will be taken by the various transportation vessels/vehicles 820

In one embodiment, a user device 823 on the passenger transport vessel/vehicle 820 will initially establish a local wireless connection with a connection manager 823 on the passenger transport vessel/vehicle 820 (e.g., on the plane, train, etc.). Once connected, the user device 823 may request content from the content provider 401, 601, for example, by logging in to Netflix and attempting to stream a particular movie. If a connection over the Internet 200 is available, the content provider 401, 601 may receive the request, identify the user device 823 as operating within the content distribution network of the content service provider 152 (e.g., identifying this based on the dynamic network address assigned to the user device 823), and transmit a redirect message, instructing the user device 823 to connect to the CSP cache 710 (e.g., a Netflix OCA cache). Upon attempting to access the content from the CSP cache 710, the connection manager 823 and/or TIC manager 822 may determine that the requested content is cached locally within the TIC 810 and redirect the request to the TIC 810.

The user device 823 then streams the content from the TIC 810 over the local wireless connection provided by the connection manager 823 (e.g., a local WiFi connection). As such, even if the passenger transport vessel/vehicle 820 is out of range of the Internet 200 (e.g., on a cruise ship at sea, a train travelling through the mountains, etc), user devices 823 can still access authorized content locally. Alternatively, if the Internet connection 200 is available, only the initial user requests and/or user authentication may be transmitted over this link (relatively low bandwidth transaction) but the content will be streamed from the local TIC 810.

Note that the TICs 610 described above may include any or all of the components shown in FIG. 8 including a TIC manager 822, a physical TIC cache 810 and potentially also a connection manager 823 and high speed interface 828.

Figure 9:
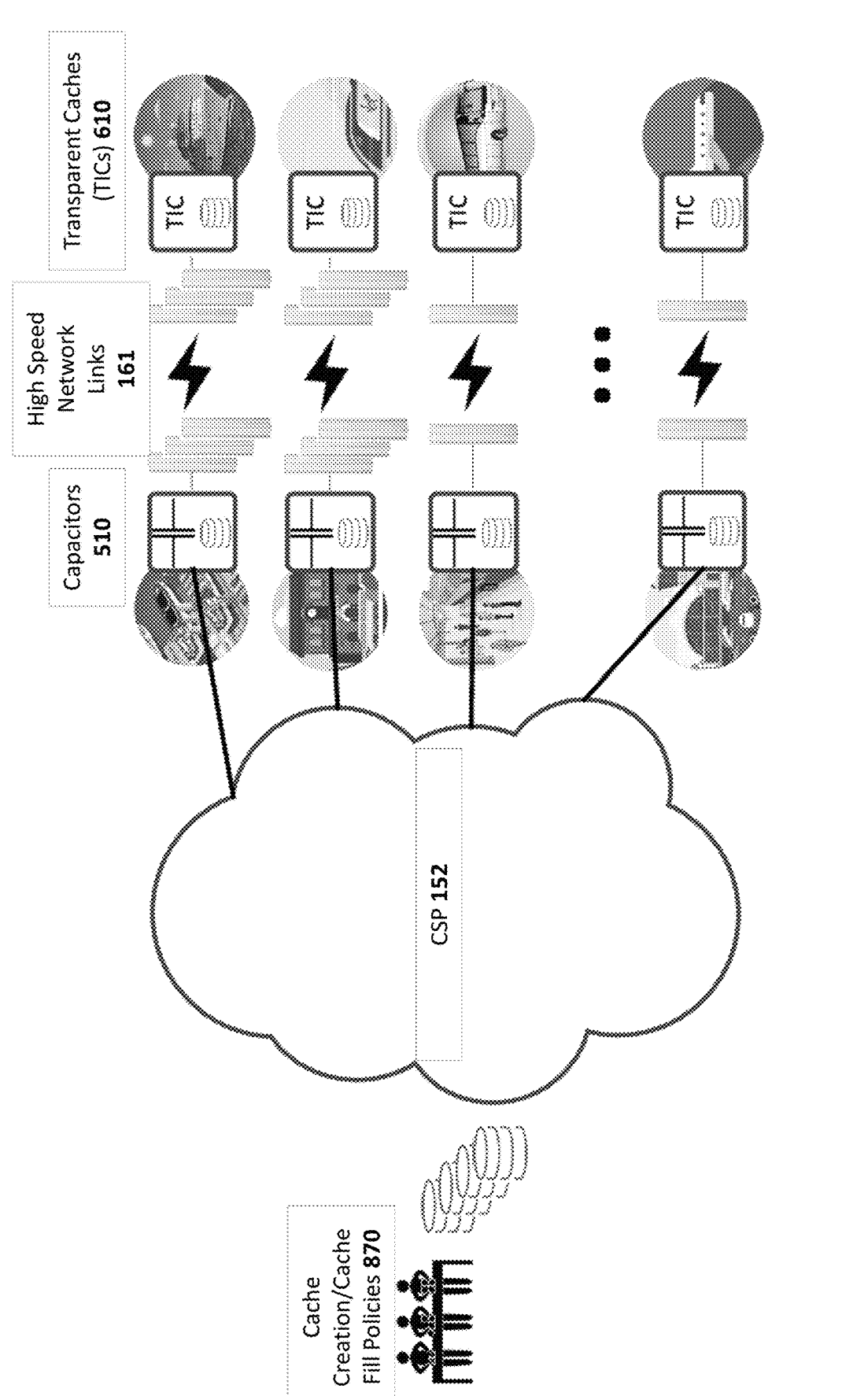
FIG. 9 illustrates interaction between capacitors and TICs in one embodiment.

FIG. 9 illustrates an arrangement in which multiple TICs 610 configured within different types of transportation vessels/vehicles are periodically updated over high speed network links 161 from a plurality of capacitors 510. As mentioned above, the content service provider 152 fills the caches at each of the capacitors 510 in accordance with a cache fill policies 870. For example, the cache management controller 850 may distribute content in response to content usage data received from the content provider and/or from the individual TICs 610. In this embodiment, the TICs 610 may monitor content usage throughout the day and report usage statistics back to the cache management controller 850. The cache management controller 850 may then uniquely tailor the content for each individual capacitor location and/or each individual TIC.

As mentioned, the content service provider 152 may deploy high-speed networks and capacitors 510 at numerous strategic locations for the customer and/or specific industries. Each of the capacitors 510 will be updated from the central cache management controller 850 via a cache distribution network as described above. It is important that all of the relevant capacitors 510 have consistent data, so that each vessel/vehicle 820 can consistently request data whenever connected.

In one embodiment, the various TIC components described above are deployed on the transport vessel/vehicle 820 as a network appliance with a memory for storing program code and data, a processor for executing the program code and processing the data, and a mass storage device to implement the TIC storage such as a set of one or more hard drives. One or more other network interfaces may also be included and used when the vessel/vehicle 820 is in transit (e.g., a satellite service, cellular service, long range WiFi, etc). The appliance may have different shapes, sizes, and capacities. Because the goal is to have a common cache database for all appliances, storage performance will significantly differ between deployments (e.g. a $1000 per 30 TB storage array may be sufficient for 50 streaming sessions, while a $10,000/30 TB storage array may be needed for 1000 streaming sessions).

In one embodiment, the appliance may be deployed in a single or multiple physical components. In one extreme, the appliance is a single server, while in another, it is a rack of servers. This is because the core functions of the TIC can be delineated as a) management functions, b) cache storage management, c) packet interception/flow redirection, and d) serving video requests from clients (via redirect). As a result, the entire functionality could be included within a single server; or it could be delineated/scaled by one or more servers per function. The underlying principles of the invention are not limited to any particular arrangement.

Figure 10:
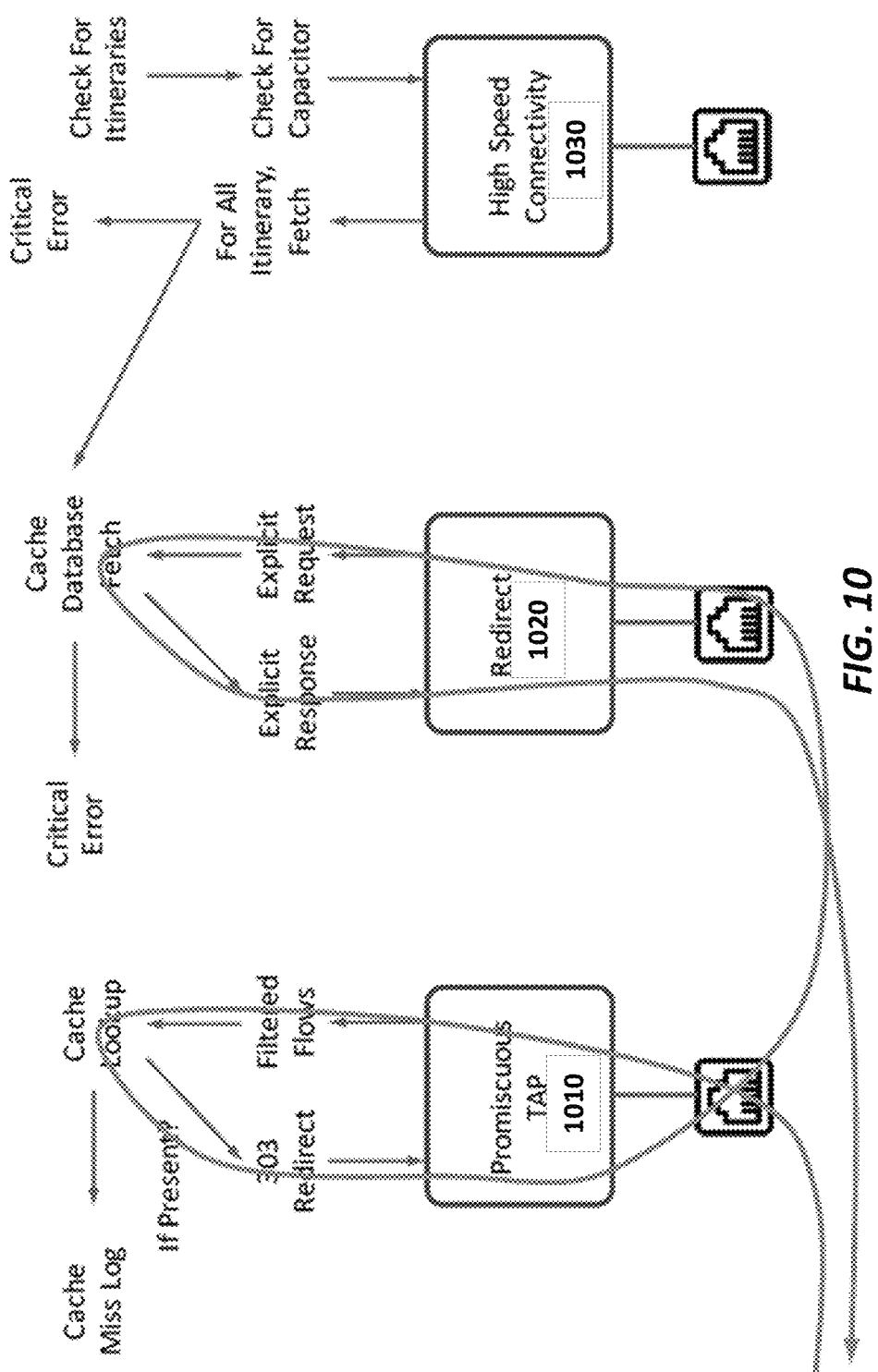
FIG. 10 illustrates one embodiment for redirecting client requests to a local cache.

FIG. 10 provides an overview of an example transaction through the connection manager 823 of a TIC 610. A promiscuous terminal access point (TAP) 1010 monitors packet/flow on the network, and after some analysis, a positive lookup into the cache triggers a redirect (1003). The client then re-requests the content from the local redirect http server 1020, which serves the content from the local TIC 610. In one embodiment, the connection manager 823 monitors the high-speed connectivity via interface 828 out-of-band, and proceeds to download cache updates where and whenever possible.

One requirement for the TIC is that it is part of a managed service. Ideally, the customer simply plugs it in and turns it on. As a result, one embodiment of the system addresses all operational elements autonomously via a central management component 895. For example, each installation may connect to the central management component 895 which provides a host of provisioning functions for new installations. In one embodiment, the management component 895 uses a Linux command line, with additional services being invoked and added as necessary.

Some example functions of the central management component 895 include software updates, notifications to network operations users and/or customers, health monitoring including functions to report on CPU, memory, storage, and network utilization, and LAN management tools to determine how many devices are streaming and how the LAN is performing (e.g., to identify bottlenecks).

Referring again to FIG. 10, one embodiment of the promiscuous TAP 1010 uses an Ethernet port running in promiscuous mode. In this embodiment, access to an Ethernet LAN segment is provided over which all traffic traverses. The promiscuous TAP 1010 listens to all traffic, but filters out any traffic not associated to relevant web requests.

In one embodiment, the promiscuous TAP 1010 uses a Data Plane Development Kit (DPDK) library for managing packets to perform functions such as a 5-Tuple Hash to delineate flows, timestamp and maintain packet order, and support for hardware assistance. In this embodiment, packets read from the promiscuous port are classified, timestamped, and either dropped or scheduled within a FIFO for processing. A multi-threaded architecture may be employed.

In one embodiment, once a hashed stream has been identified, the URI is extracted and checked against the TIC database. If there is a match, then both source and destination points of stream are reset with a FIN packet. But first, the source of the request is sent an HTTP 1003 redirect back to the appliance. Load balancing may also be performed. The redirect may, for example, implement a round robin load balancing, or a single interface may be managed by a load balancer, with multiple servers load balanced behind it.

In one implementation, an efficient "Cache Information Base" CIB is maintained with mirrors the actual TIC database to allow efficient determination as to whether a requested entry exists locally. When a TIC is loaded onto an appliance, the various functions will need to lookup content quickly. In one embodiment, packets destined for the appliance (e.g. management and redirected cache hits), are forwarded to the Management Function or the TIC—essentially, they are ignored by the promiscuous TAP 1010.

Assuming wireless technologies are used for the high speed links 161, a standard MIMO implementation with an 80 Ghz band will achieve 655 Mbps. A 4×MIMO might achieve 2.4 Gbps. 24 Ghz and 60 Ghz radio equipment can also considered. Products exist with 2.4 Gbps in the 24 Ghz spectrum, and 6-10 Gbps radios in the 60 Ghz band. In all cases, link aggregation may be used to aggregate multiple wireless connections (leveraging GPS synchronization, frequency spacing, and signal isolation) to multiply this number. Conceivably this could provide throughput in the 10-50 Gbps range.

Figure 11:
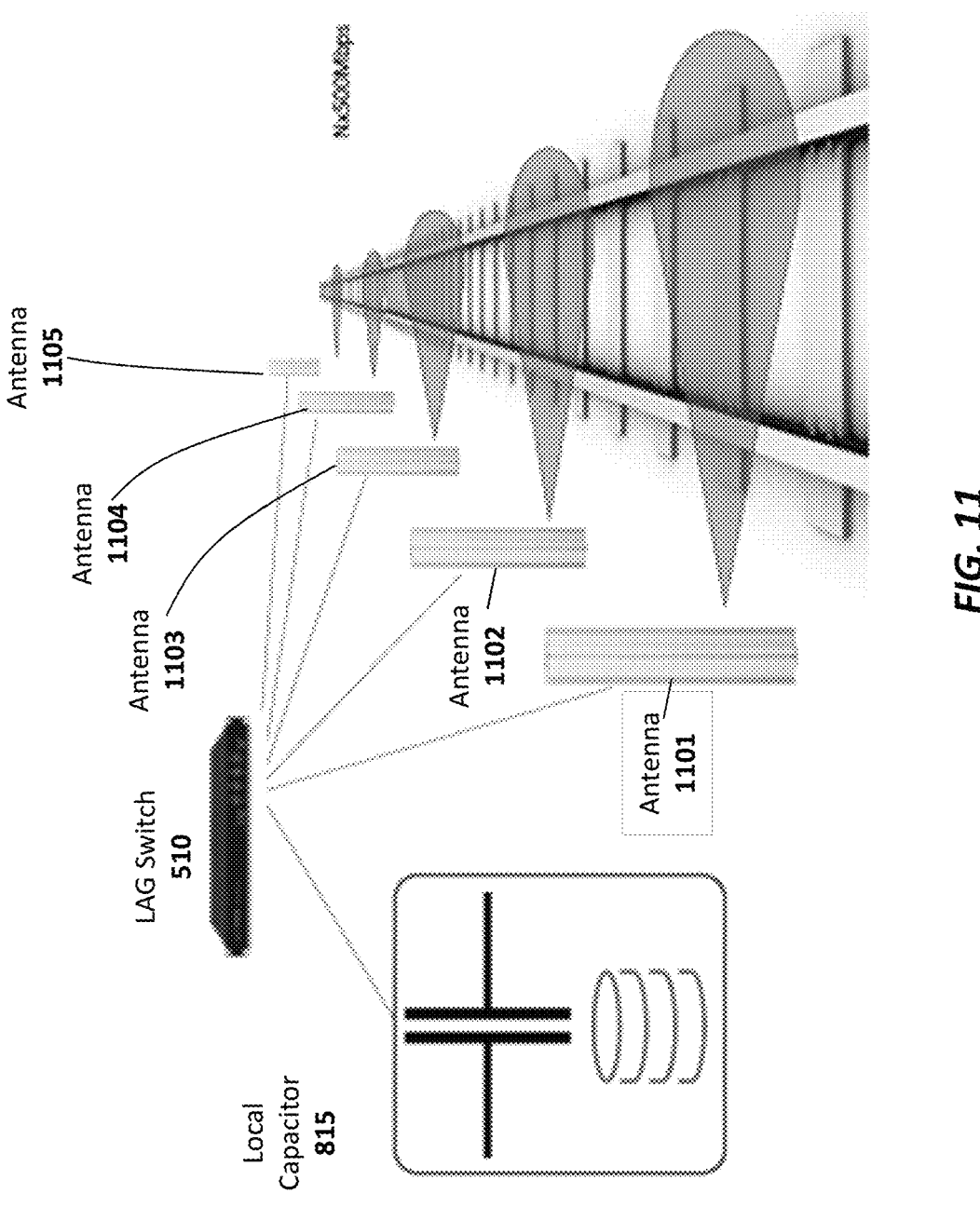
FIG. 11 illustrates an exemplary embodiment with multiple antennas to provide content to a TIC on a train.

As illustrated in FIG. 11, in one embodiment, each stationary content distribution location, such as a train station, airport terminal, bus depot, or cruise terminal has multiple antennas 1101-1105 aligned to the vessel/vehicle entering the station/terminal. One or more capacitors 815 are coupled to the multiple antennas 1101-1105 via a LAG switch. The multiple antennas will transmit content from the local capacitor 815 concurrently over the multiple links, potentially achieving N times the bitrate of one wireless link, where N is the number of antennas.

While a train implementation is illustrated in FIG. 11, similar arrangements may be configured for ships, planes, and buses. Certain implementations may not be able to accomplish the same connectivity aggregation (e.g., only support one radio connection). Nonetheless, 2.5 Gb/s may be achieved for a single antenna solution, which should be sufficient if the vessel/vehicle is stopped at the location for a sufficient period of time. In any case, partial updates to the TIC may occur each time the vehicle/vessel stops near or passes by another capacitor (e.g., at each train station).

Figure 12:
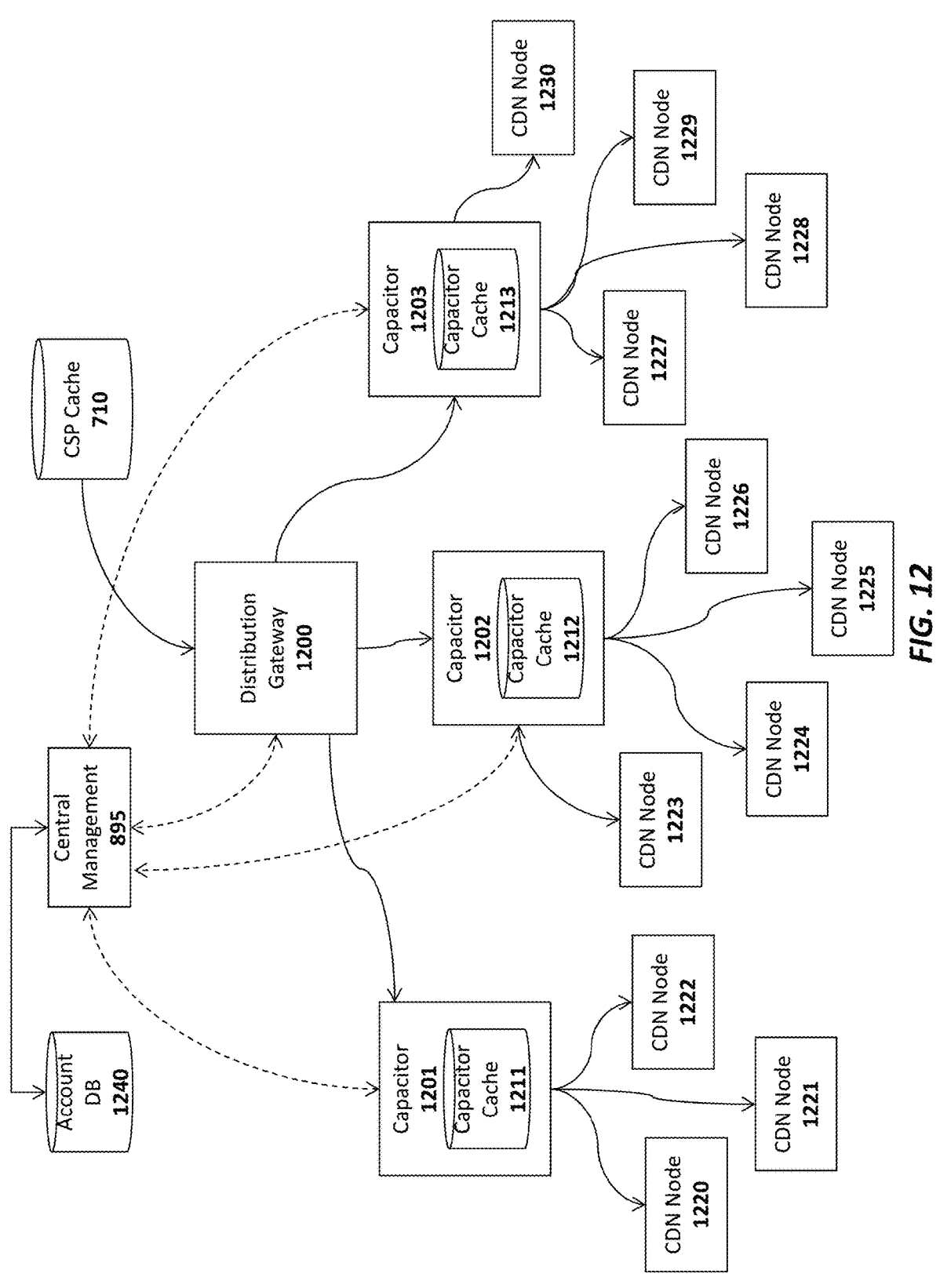
FIG. 12 illustrates one embodiment of a hierarchical arrangement for propagating content.

As illustrated in FIG. 12, one embodiment includes one or more distribution gateways 1200-1203 which are repositories for content to be pushed to the capacitors 1201-1203. Each distribution gateway (DG) 1200 may be set up regionally (e.g., west coast, east coast, Midwest, etc). When a capacitor 1201-1203 is initialized, it will attempt to register with the DG which is closest to it (e.g., the west DG if it is in California). These regional DGs may be identified through DNS scoping (e.g., a capacitor 1201 may connect to a Vancouver-based DG vs. a New York DG because of the proximity).

In one implementation, the DG may simply be an API to a CDN network such as CloudFront's or Akamai's. Ultimately each DG is provided data from the CSP cache 710 which capacitors 1201-1203 will request/have pushed. Given the size of the cache datasets, efficiencies such as Multicast may be used to stream content through the cache hierarchy.

In one embodiment, all capacitors 1201-1203 in the field will register to a DG 1200. Some exchange of dataset inclusion should scope what data needs to be sent to a specific capacitor 1201-1203. When new data is curated at the CSP cache 710, each DG 1200 will initiate a transfer to its registered capacitors 1201-1203. This may be implemented as a push or pull transaction (or both). Scheduling requirements on each capacitor 1201-1203 may play a role in the specific push/pull configuration. In one embodiment, the capacitors 1201-1203 are notified when new content is available, and must then request the data.

In one embodiment, each capacitor 1201-1203 is a server with sufficient storage to retain multiple cache datasets (or a single master cache dataset, from which near derived datasets can be created). The primary purpose of the capacitors 1201-1203, is to have as much data as possible at the high speed network edge. It may receive requests from a single or concurrent CDN Nodes 1220-1230 (and/or TICs), and is able to fill the available Pipe(s).

When a CDN Node 1220-1230 (and/or TIC) connects to a capacitor 1201-1203, it identifies itself, and requests an itinerary of recent updates. The CDN Node may identify itself, for example, based on the vehicle/vessel, customer ID, etc. Based on this, the capacitor 1201-1203 services the CDN Node 1220-1230 with appropriate itineraries specific to the device. The CDN Node will then evaluate the itinerary, comparing it to what it currently has downloaded, and what still needs to be downloaded. It will then proceed to request specific elements from the capacitor 1201-1203.

In one embodiment, a capacitor 1201-1203 will include at least 30 TB of storage, with a read speed of at least 10 Gbps, but preferably 50 Gbps. The internet interface is minimally a 1 Gbps connection, but the actual Internet connection should be at least 100 Mbps. The High Speed network interface must be at least 10 Gbps, but preferably 40 Gbps (4×10 Gbps or 1×40 Gbps). These interfaces will connect to the single or array of link-aggregated high-speed links described above. In addition, a capacitor 1201-1203 may initiate connectivity back to the central management component 895 for management purposes. In one embodiment, the central management component 895 supports operations, administration, maintenance, and provisioning (OAMP) functions.

In one embodiment, each capacitor 1201-1203 will declare its inventory assets, provisioned location, etc, and may request the identity of all anticipated customers and/or corresponding CDN nodes that may come into the vicinity of the capacitor 1201-1203. For example, in one embodiment, the central management component 895 maintains an account database 1240 which identifies all CDN nodes/TICs and associated customers and an association between those CDN Nodes/TICs/customers and one or more capacitors 1201-1203.

In one embodiment, should an unexpected CDN Node/TIC attempt to register with a capacitor 1201-1203, an error is reported to the central management component 895 which will have the ability accept or deny the CDN Node/TIC. If accepted, the capacitor 1201-1203 records and accepts this action persistently (e.g. it does not need to be provisioned again).

Based on all the known customers/CDN Nodes/TICs that will come into the vicinity of a capacitor 1201-1203, the capacitor may request the current list of itineraries and cache datasets (individual or master), as well as any other customer-relevant information. The capacitor 1201-1203 may also register for update notifications, so when the central management component 895 and or curated cache includes new information, it can be pushed to all capacitors 1201-1203 as needed. In one embodiment, scheduling may also be employed so that when a capacitor receives a notification, it will not be acted upon until a designated time (e.g., 2 am). In one embodiment, a proxy device may be configured to imitate the presence of a CDN Node/TIC, and orchestrate the capacitor 1201-1203 as if it were connected in a standard mode of operation.

The capacitor 1201-1203 will wait for registration requests from the high speed network (e.g., for a ship, bus, train, or plane to arrive). When a request is received and validated, a download service will be started for the remote CDN Node/TIC to download new content. Essentially, once authorized, the download can be implemented in a similar manner as an FTP service. The structure of the cache dataset should be considered as tuple sets and blocks of tuple sets. The CDN Node/TIC knows what it has received at other locations, and is responsible maintaining continuity between download sessions. The capacitor 1201-1203 in this implementation may simply be responsible for making the tuple sets available to the CDN Node/TIC.

The capacitor 1201-1203 should be capable of handling more than one TIC at a time. Clearly different capacitor configurations will have different limitations, in terms of concurrent download sessions. The primary limitation will be the network capacity available. In a scenario where many CDN Nodes/TICs may be making concurrent requests, a rack of servers all connected to a single storage array and high capacity switch may be employed, where each server supports 2 or 3 download sessions. In aggregate, the rack can handle 100's of sessions.

Additional Implementation Details Used in Different Embodiments of the Invention In one embodiment, a Point to Point/Multi-Point High Speed Network is used. The vehicle/vessel may connect to a point-to-point radio, or a multi-point radio. They key differentiation is that large datasets are transmitted between the two points. If two or more vehicles/vessels connect to the same access point, the overall throughput will simply be reduced. As in the above example, the fastest transfer rate would be approximately 10 hours for 10 TB. This would be doubled with 2 concurrent transfers.

In one embodiment, the radios will initially connect based on a well known SSID and WPA2/PSK. When the Vehicle/Vessel station comes within range, the wireless link is established. In one embodiment, the Vehicle/Vessel station will be configured as a DHCP client. The access point, or the capacitor behind the access point will provide a DHCP server. Configured within the server will be common DNS entries. For example "capacitor.netskrt.io" will resolve to the local IP address.

In one embodiment, the CDN Node/TIC 610 may either constantly poll the capacitor 510, independent of the High Speed link status (e.g. if it can poll the capacitor 510 on a specific port, then it must therefore be connected) or the TIC can make API calls to the station radio to determine if/when the link is present. The advantage to the latter solution is more deterministic behavior vs. timeouts that could be tied to diverse reasons. The disadvantage is that a hardware abstraction layer may be needed to address changing technologies. Once the connection to the capacitor 510 is established, the TIC 610 will proceed with its Cache Update process described above. Of course, the underlying principles of the invention are not limited to the particular manner in which the connection between a capacitor and TIC is made.

The Point to Point Array High Speed Network exists for an array of wireless connections to be link aggregated between the Vessel/Vehicle and the terminal where the capacitor 510 resides (as described above with respect to FIG. 5). The advantage of this approach is that 10 or 20 high speed connections may be established. If each connection were to achieve 2.5 Gbps, this would generate 25 to 50 Gbps High Speed Links. From a theoretical perspective, a 10 TB cache dataset 725 would be transmitted in approximately 30-60 minutes; or a 30 TB cache dataset 725 2-4 hours; depending on the number of elements within the array.

This solution will work particularly well with "long" vessels/vehicles, such as Ships and Trains. Shorter vessels/vehicles may not provide enough separation between radios to permit multiple connections that do not interfere with each other at a wireless level.

The concept of an array, requires a series of radios to be placed on the side of the Vessel/Vehicle. Therefore, in one embodiment, they are consistently spaced at the terminal. So when the train or ship docks, it will be perpendicularly aligned with each corresponding radio. A 30-45 degree sector might be appropriate to allow some play (e.g. ship might be 10' off the ideal, but still captured by the width of the corresponding radio).

If each radio has the same SSID, but only supports Point-to-Point connections, then once it is connected, the subsequent radios will need to connect to another available SSID. If the Vehicle/Vessel parked and then turned on its radios, this works well. However, if the radios connected while the Vehicle/Vessel came to a stop, then it might result in sub-optimal radios retaining their connections.

For example, if a ship has radios s1, s2, s3, s4, and s5 and when the ship comes into port, radio s1 establishes a connection to corresponding port radio p5. As it moves forward, it loses this association and connects to p4, p3, and p2. When finally at rest, it may not shift to s1, resulting in a sub-optimal connection of s1-p2, s2-p3, s3-p4, and s4-p5. Neither s5 or p1 connect. One solution is to have each radio with a pre-ordained SSID mate such that both s1 and p1 have "Netskrt-1" as their paired SSID.

In one embodiment, the management component 895 is used to deploy a capacitor 510. When the capacitor 510 is activated, it registers itself with the management component 895, which in turn adds it to the database 640 and begins monitoring it for health. If a customer logs into the portal 741, they will see the presence of the capacitor 510 and its current status.

Updates may be pushed to the capacitor 510 via the management component 895 which may also provision various capabilities, monitor the attached High Speed Network, and perform other standard OAMP functions. The management component 895 determines all known cache datasets appropriate for the capacitor 510. Moreover, the management component may set a schedule for the capacitor 510 which may be specified via the operator portal 740 and/or customer portal 741.

In one embodiment, the management component 895 is used to deploy new CDN Nodes/TICs 610. When the CDN Node/TIC 610 is activated, it registers itself with the management component 895, which in turn adds it to the database 640 and begins monitoring it for health, cache content, and connected state. The CDN Node/TIC 610 may be provisioned to be in a monitoring mode, or as an active cache. The management component 895 can push cache provisioning updates to appropriate capacitors 510, that in turn will trigger an action on target CDN Nodes/TICs 610s when them come into range.

In one embodiment, the CDN Node/TIC 610 is configured to have a GPS location which is reported back to the management component 895 periodically. One embodiment allows the system operator and/or the customer to track the location of the CDN Nodes/TICs. Each CDN Node/TIC 610 may also report on its operational status on a periodic basis including data such as cache hits, misses, and monitoring status. These updates may be reported through capacitors 510.

New cache datasets may be generated on a regular basis. At a scheduled point in time, each customer cache update will be scheduled for the appropriate capacitors 510 and transmitted. The mechanism for the packaging a cache dataset is currently contemplated to be a single Master cache dataset, with Itineraries associated to each Customer/CDN Node/TIC. The customer may can log in through a web portal and augment the management policies 870 associated with its itineraries. For example, the customer may select geographic, language, or distribution stream specific content.

As described above, a trending cache is a special type of push operation which may be implemented on the low speed network link. This cache is either auto-generated based on specifications from the customer or from other sources (e.g. the content provider itself). A limit may be placed on the cache dataset size. Scheduling data may also be necessary for its distribution and can be set by the customer through their portal. Current News feeds need to be distributed in a timely manner. Either direct to the TIC or on mass via capacitors.

One embodiment includes an operator portal with a hierarchical GUI to view all customers currently active. When a single customer is selected the GUI will display customer details; the total number of customer specific capacitors; the health of the capacitors; the current active cache dataset; the number of CDN Nodes/TICs connected currently, last hour, last day, last week, etc.; an error log for the capacitor; the High Speed Network, CDN Nodes/TICs, etc.; the total number of cache dataset transfers to capacitor; and the total number of cache dataset transfers to CDN Nodes/TICs. Additional information which may be hierarchically displayed includes, but is not limited to:

Total number of customer CDN Nodes/TICs

Location of each TIC

Current state of TIC

Total amount of traffic generated by the TIC

Total number of Cache Misses by the TIC

Number of cache dataset 725 updates by TIC

Mean time to update for cache dataset 725

Number of capacitors 510 visited by the TIC

Maximum number of devices connected to TIC

Mean number of devices connected to TIC

Journey data, correlated to statisCDN Nodes/TICs

Total number of cache dataset 725s/Itineraries

Usage metrics on cache dataset 725s/Itineraries.

Efficiency of Cache Distribution (e.g., we ship 4 cache dataset 725s for every 1 downloaded).

Effectiveness of the cache dataset 725s relative to other customers/CDN Nodes/TICs (e.g., Dataset 3 has a 20% hit rate for this customer, while every other customer has a 60% hit rate for the same Dataset).

Customer Portal Activity/History. When the customer screws things up, need to be able to check the history of the provision requests made by the customer. Where, what, when type of data. Possibly have the ability to roll back changes.

Thus, the embodiments of the invention contemplate the deployment of caches into mobile environments with various levels of connectivity, including predictable connectivity and unpredictable connectivity. In one embodiment, the system operator is an ISP on behalf of customer who have mobile environments such as trains, planes, buses, and passenger ships.

One embodiment of the system associates a subnetwork of public addresses to the different mobile environments (i.e., different vessels/vehicles) and peers with content providers using BGP (or other protocol). The system associates the different subnetworks with deployed caches so that the content providers can direct client devices to the local cache.

The client device connects to the content provider on either network link and predictable connectivity is defined by time and location. If the mobile environment is in a specific location where a high speed connection can be established for an extended period of time, on a deterministic periodic schedule, then its connectivity is predictable.

One embodiment of the system schedules cache fills with the content provider during these scheduled periods, because connectivity speeds can be guaranteed to meet the requirements of the content provider. While the figures show a single curated cache 155, one embodiment includes at least one cache per content provider, to enable cache fills to peer from. One embodiment provides connectivity to each high speed network, back to the content cache that is used for peering Thus, the embodiments of the invention extend the concept of an ISP to include special connectivity to mobile environments that otherwise would not qualify as a) ISPs, and b) connected locations qualified for cache fills. These embodiments also uniquely enable existing mechanisms to localize to mobile environments by controlling IP addressing, distribution, and connectivity back to the content provider. In addition, the embodiments uniquely define a dual homing connection to enable both at en-route and at rest connectivity to fulfill unique aspects of the cache life cycle.

As mentioned, in some embodiments, caches are also deployed into mobile environments with nonpredictable connectivity—i.e., where the high speed connectivity is not predictable form a time or location perspective. For example, a cruise ship that travels from Vancouver to Alaska may stop at several ports over the course of several days where a cache fill may be implemented. The duration of time may differ from location to location, making it difficult for the cache to be completely filled at one stop. Thus, the cache may be incrementally updated at each stop, where the high speed link speed from shore to ship is set as high as possible to minimize the time needed.

One embodiment employs a capacitor and a CDN node to manage the nondeterministic nature of the high speed network. The capacitor is a storage facility with one network connection that is used for cache distribution, and one network connection to the high speed connection that is used to forward content to the mobile environment. The CDN node is within the mobile environment and has one connection to the high speed network, and one connection to the mobile environment. Its responsibility is to fully receive a cache update from one or more capacitors over one or more locations and over discrete periods of time. When the content has been aggregated together, the CDN node can fulfill a scheduled cache fill with the local cache device. The local content cache believes it is operating on a consistent schedule, even though it took several stops of the mobile environment to complete.

Many capacitors can be deployed at many locations and trickle fed with cache content over lower speed network connections for cost effectiveness. Thus, there is a relationship of many mobile environments to many capacitor locations. Transient connections fulfill the mobile environment cache updates. Once the cache is updated, the address domain of the cache informs the content provider which cache serves which clients.

Thus, the embodiments of the invention uniquely enable environments that cannot deterministically meet the requirements of a cache deployment by aggregating connectivity over a period of time and space, to shift the requirement of update to the local mobile environment. If sufficient connectivity events can be guaranteed between a periodic cycle to aggregate content into the local environment, then the local cache can fulfill its cache fill requirements without realizing that it does not have a limited connection. Multiple caches from multiple content providers can be satisfied by these techniques.

One embodiment deploys CDN Nodes/TICs that serve content caches in a highly scalable implementation. Building on the above implementations, the number of caches may begin to become uneconomical to deploy because (1) existing caches are targeting 10's of Gbps of streaming traffic; and (2) IP addressing is used to direct end user devices to the appropriate cache.

A transparent cache (TIC) that contains the content of one or more content caches can address these issues. For example, a single transparent cache may utilize the high speed network mechanism described above to retain a current cache for multiple content providers. Moreover, with the ISP model, a single addressable cache may be identified to handle an entire address domain of users. For example, thousands of end user devices could all be associated with a single cache and the logistics shared with the content provider via BGP. With the system herein operating as the ISP, 100's of transparent caches may be deployed that would intercept traffic targeting the advertised case (thus locally intercept the requests). These transparent caches then scale well beyond the existing mechanisms. In addition, because the ISP provides a single transparent cache for multiple content channels, economies of scale can be achieved across multiple content channels, making the solution viable.

Peering with specific content channels would implement content and security certificates. If Netflix permitted the transparent cache to be deployed with content that is equivalent to an OCA and, as reported, TLS encryption may be used for content distribution. As a result, Netflix signed certificates would be needed to intercept and serve up intercepted requests. If the same content sanctioned from Netflix is used, as in the upstream OCA, then any request to that OCA is a valid cache hit. Every flow initiated to the known OCA may be intercepted, followed by a 303 redirect to the device and service the request locally. The redirected request establishes a TLS session with the transparent cache, which is fulfilled by a Netflix certificate, thereby providing Netflix a level of control over the distribution of their content. Locally stored content, which is distributed with content provider (e.g., Netflix) permission, may now be served up to the client devices. A number of constructs could be introduced to ensure Netflix or other content owners can verify how content has been accessed will outside of their scope of explicit control.

In a pure transparent cache environment, where cache data is curated in one geography and deployed in another geography there is a requirement to understand what requests are collectively the same. For example, there are more than 6500 OCA caches deployed globally. Conceivably every transparent cache that is in a mobile environment will need to consider all 6500 addressable points to verify if a request is for a locally-stored segment of content. One embodiment crawls the internet for cache addresses, and provide lists of addresses for comparison. Another embodiment applies contextual information of the location of the transparent cache (or the mobile environment on which it resides) to determine which OCA cache addresses are likely to be considered.

If the operator of the above system is the ISP of record, either explicitly, or through overlay networks, the target cache addresses can be narrowed to those provided by the operator.

Given the nature of the transient high speed/permanent low speed links described above, one embodiment of the invention evaluates the urgency or importance of specific content and, in some instances, uses the low speed link to fill the TIC. The portion of the TIC containing this urgent/important content is referred to herein as a "trending cache."

One embodiment allocates a certain percentage of low speed bandwidth to the trending cache to allow high-demand data to be filled into the trending cache all the time. In some instances, all or a significant percentage of the low speed bandwidth may be temporarily allocated to fill the cache with a particular multimedia file which is being frequently requested.

One embodiment uses the mobile environment to propagate content throughout the network. In certain embodiments described above, capacitors may be deployed in far away places that do not necessarily have decent high speed connectivity. For example, if a 100 Mbps link is the maximum a remote port to a capacitor can support, then a 30 TB fill would take approximately 28 days. in contrast, a 15 Gbps link could make the transfer in under 5 hours. Consequently, one embodiment establishes high speed connections with passing vessels/vehicles whenever possible to download content from the temporary caches over a high speed link. For example, the capacitor may retrieve content from a temporary cache on a ship that is travelling over the course of a day to another port. Then the temporary cache on another ship travelling in the reverse direction could update sooner from the remote capacitor.

Thus, the capacitor includes two modes of operation. It would always have a broadband connection, but maybe <1G would be a maintenance connection and >=1G would be cache fill connection. If only a maintenance connection exists, the capacitor is filled over the WAN. If a cache fill connection, the capacitor would not be fully filled over the WAN.

One embodiment of the capacitor will only retrieve data from the passing vessel/vehicle which is more recent than the data it is currently storing. For example, if the capacitor only needs image A, then it will only retrieve image A from the passing vessel/vehicle. In contrast, the temporary cache on the vessel/vehicle may have out of date copies of images B and C, in which case it will retrieve them from the capacitor.

For example, the maintenance connection may be used to distribute metadata regarding the current cache datasets. Image A, B, C are considered current, and the capacitor should have them. When a CDN node connects with the local high speed network, the following protocol may be invoked:

CDN Node—do you have A, B, or C?
  Either start downloading, or continue downloading from wherever the CDN Node previously stopped filling.
  If capacitor doesn't have A, B, or C, don't do anything
Capacitor—do you have A, B, or C?
  If yes, capacitor either starts downloading, or continues downloading from the connected CDN Node.
  If capacitor already has A, B, or C, or CDN Node doesn't have either, don't do anything In one embodiment, the cache fill connection is used to both distribute metadata and the actual datasets. Depending on the speed of the link, and/or the availability of content, reverse filling from a temporary cache on a vessel/vehicle may make sense.

A 30 TB fill would still take 3 days on a 1 Gbps connection. If a ship showed up with a full link, and 50% was downloaded on the WAN, it makes sense to calculate what percentage could be downloaded on the 15 Gbps link, while its available. One embodiment of the capacitor operates according to a set of rules/policies. For example, one requirement might be that the capacitor is to download 1-50% on the WAN, and concurrently download 51%-100% on the high speed connection in reverse order. Then determine when the whole cache has been completely downloaded.

Other implementations may download some percentage (e.g., half) when the high speed link is available. If complete, download half of what is still left. If complete, download half again (similar to a binary search algorithm). The cache of one embodiment is downloaded in segments and any random point in time may result in the link being lost. Therefore, one embodiment includes checkpoint circuitry/logic to checkpoint the downloads (i.e., to restart or continue as permitted).

Globally, one embodiment tracks all of the capacitors, and all vessels/vehicles that may intersect with them. By performing analytics, it may be determined how long it takes for all capacitors to come up to date. With a sufficient number of high speed network connections any capacitor or any size could be refilled within 1-2 days.

Consequently, using the techniques described above, the vessels/vehicles become a mobile portion of the network and are used to propagate updates to remote network components (i.e., remote capacitors).

In the existing ISP partner program, cache providers such as Netflix and Google, allow their own property to be hosted by ISPs. Using various mechanisms, the ISP can manipulate some of the logistical aspects of the deployment, but ultimately, the only place the ISP sees content is on the wire. It is only stored within the over-the-top (OTT) providers devices at rest.

In order for certain embodiments described herein to work, the OTT provider must be willing to support pooling of their content within the network (e.g., at rest within the ISPs infrastructure); for example, within capacitors, CDN nodes, and CDN Nodes/TICs. To make this arrangement acceptable to the OTT providers, one embodiment of the invention implements certain protection mechanisms:

The ISP is prevented from extracting content in its native at rest form. In addition, the OTT provider is provided the ability to track where the content is pooled. Moreover, the OTT provider is provided the ability to delete pooled data and no third party is permitted to copy and/or extract the pooled data.

With these preconditions, one embodiment of the invention performs additional layers of encryption on the content and provides markers within the data that validates its authenticity (e.g., such as a block chain). For example, every copy of the data may receive a unique block chain entry and key and can only be decrypted with the block chain. If the data is deleted or removed, then the data is rendered useless.

Instead of a block chain, another embodiment uses a cypher that is time sensitive. For example, a copy which is made may only be valid for a specified duration of time (e.g., a week, a few days, etc).

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a nontransitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (nontransitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system to be equipped in a transportation vessel/vehicle, comprising:
   a cache to store multimedia content from a plurality of content providers including subscription-based content providers requiring authentication;
   a first network interface to establish a first wireless connection to a set of edge caches of one or more content service providers prior to the transportation vessel/vehicle arriving at one of a plurality of designated locations, each of which include one or more source caches filled with multimedia content retrieved from the plurality of content providers;
   a second network interface to establish a second wireless connection that provides a wireless link with higher bandwidth than the first wireless connection upon the transportation vessel/vehicle arriving at one of the plurality of designated locations; and
   logic to identify portions of multimedia content from each of the plurality of content providers to be transmitted to the cache, wherein the cache is to be filled from the set of edge caches as the transportation vessel/vehicle reaches a corresponding one or more of the plurality of designated locations, and wherein one or more requests for the multimedia content first reach one or more of the plurality of content providers through the first wireless connection and then are redirected to the cache.

2. The system of claim 1, wherein the redirecting comprises detecting a request for multimedia content of a first content provider from a user device, determining that a copy of the multimedia content is stored on the cache and that the user device is authorized to access the multimedia content, and serving the request from the cache.

3. The system of claim 2, wherein an authorization request is transmitted to the first content provider over the first wireless connection and the request is to be served only upon receiving a response providing authorization.

4. The system of claim 3, wherein the user device is assigned to a network address from a block of network addresses allocated to the transportation vessel/vehicle by the one or more content service providers.

5. The system of claim 3, wherein the response from the first content provider includes a redirection address to redirect the request to the cache.

6. The system of claim 1, wherein one or more current locations of an item of the multimedia content from the plurality of content providers, and each of the plurality of content providers is provided access to determine the one or more current locations of the item of the multimedia content.

7. The system of claim 1, wherein a first multimedia content is transmitted from the cache to the set of edge caches as the transportation vessel/vehicle reaches the corresponding one or more of the plurality of designated locations, and wherein the first multimedia content is to be transmitted to a second cache of another transportation vessel/vehicle upon the another transportation vessel/vehicle reaching the corresponding one or more of the plurality of designated locations.

8. A method comprising:

storing multimedia content to a cache of a transportation vessel/vehicle from a plurality of content providers including subscription-based content providers requiring authentication;

establishing a first wireless connection through a first network interface to a set of edge caches of one or more content service providers prior to the transportation vessel/vehicle arriving at one of a plurality of designated locations, each of which include one or more source caches filled with multimedia content retrieved from on the plurality of content providers;

establishing a second wireless connection that provides a wireless link with higher bandwidth than the first wireless connection through a second network interface upon the transportation vessel/vehicle arriving at one of the plurality of designated locations; and identifying portions of multimedia content from each of the plurality of content providers to be transmitted to the cache, wherein the cache is to be filled from the set of edge caches as the transportation vessel/vehicle reaches a corresponding one or more of the plurality of designated locations, and wherein one or more requests for the multimedia content first reach one or more of the plurality of content providers through the first wireless connection and then are redirected to the cache.

9. The method of claim 8, wherein the redirecting comprises detecting a request for multimedia content of a first content provider from a user device, determining that a copy of the multimedia content is stored on the cache and that the user device is authorized to access the multimedia content, and serving the request from the cache.

10. The method of claim 9, wherein an authorization request is transmitted to the first content provider over the first wireless connection and the request is to be served only upon receiving a response providing authorization.

11. The method of claim 10, wherein the user device is assigned to a network address from a block of network addresses allocated to the transportation vessel/vehicle by the one or more content service providers.

12. The method of claim 11, wherein the response from the first content provider includes a redirection address to redirect the request to the cache.

13. The method of claim 8, wherein one or more current locations of an item of the multimedia content from the plurality of content providers, and each of the plurality of content providers is provided access to determine the one or more current locations of the item of the multimedia content.

14. A non-transitory machine-readable medium having program code stored thereon which, when executed by a machine, is capable of causing the machine to perform:

storing multimedia content to a cache of a transportation vessel/vehicle from a plurality of content providers including subscription-based content providers requiring authentication;

establishing a first wireless connection through a first network interface to a set of edge caches of one or more content service providers prior to the transportation vessel/vehicle arriving at one of a plurality of designated locations, each of which include one or more source caches filled with multimedia content retrieved from on the plurality of content providers;

establishing a second wireless connection that provides a wireless link with higher bandwidth than the first wireless connection through a second network interface upon the transportation vessel/vehicle arriving at one of the plurality of designated locations; and identifying portions of multimedia content from each of the plurality of content providers to be transmitted to the cache, wherein the cache is to be filled from the set of edge caches as the transportation vessel/vehicle reaches a corresponding one or more of the plurality of designated locations, and wherein one or more requests for the multimedia content first reach one or more of the plurality of content providers through the first wireless connection and then are redirected to the cache.

15. The non-transitory machine-readable medium of claim 14, wherein the redirecting comprises detecting a request for multimedia content of a first content provider from a user device, determining that a copy of the multimedia content is stored on the cache and that the user device is authorized to access the multimedia content, and serving the request from the cache.

16. The non-transitory machine-readable medium of claim 15, wherein an authorization request is transmitted to the first content provider over the first wireless connection and the request is to be served only upon receiving a response providing authorization.

17. The non-transitory machine-readable medium of claim 16, wherein the user device is assigned to a network address from a block of network addresses allocated to the transportation vessel/vehicle by the one or more content service providers.

18. The non-transitory machine-readable medium of claim 17, wherein the response from the first content provider includes a redirection address to redirect the request to the cache.

19. The non-transitory machine-readable medium of claim 14, wherein one or more current locations of an item of the multimedia content from the plurality of content providers, and each of the plurality of content providers is provided access to determine the one or more current locations of the item of the multimedia content.

20. The non-transitory machine-readable medium of claim 14, wherein a first multimedia content is transmitted from the cache to the set of edge caches as the transportation vessel/vehicle reaches the corresponding one or more of the plurality of designated locations, and wherein the first multimedia content is to be transmitted to a second cache of another transportation vessel/vehicle upon the another transportation vessel/vehicle reaching the corresponding one or more of the plurality of designated locations.

* * * * *